United States Patent
Toyoyama et al.

(10) Patent No.: US 6,826,673 B2
(45) Date of Patent: Nov. 30, 2004

(54) COMMUNICATIONS PROTOCOL PROCESSING BY REAL TIME PROCESSOR OFF-LOADING OPERATIONS TO QUEUE FOR PROCESSING BY NON-REAL TIME PROCESSOR

(75) Inventors: Takeshi Toyoyama, Osaka (JP); Masao Nakano, Osaka (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 09/775,160

(22) Filed: Feb. 1, 2001

(65) Prior Publication Data
US 2002/0029331 A1 Mar. 7, 2002

(30) Foreign Application Priority Data
Sep. 4, 2000 (JP) .................................. 2000-267064

(51) Int. Cl.$^7$ ............................................ G06F 15/167
(52) U.S. Cl. ............................ 712/31; 700/3; 709/230; 712/34
(58) Field of Search ........................... 700/3; 709/230; 712/31, 34, 36

(56) References Cited

U.S. PATENT DOCUMENTS

| | | | | |
|---|---|---|---|---|
| 5,295,265 A | * | 3/1994 | Ducateau et al. | 709/100 |
| 5,450,411 A | * | 9/1995 | Heil | 370/352 |
| 5,621,672 A | * | 4/1997 | Kobayashi et al. | 700/5 |
| 5,699,361 A | * | 12/1997 | Ding et al. | 370/431 |
| 2002/0163918 A1 | * | 11/2002 | Cline | 370/399 |

* cited by examiner

Primary Examiner—Kenneth S. Kim
(74) Attorney, Agent, or Firm—Katten Muchin Zavis Rosenman

(57) ABSTRACT

A communication protocol processing unit by a multiprocessor is disclosed, and includes a first processor for performing a process demanding a real time property on a stream of communication data; and a second processor for performing a process not demanding the real time property, wherein the first processor transfers using parameters paired with the communication data to be processed to the second processor, and the second processor is structured so as to refer to the transferred communication data and parameters to process.

14 Claims, 19 Drawing Sheets

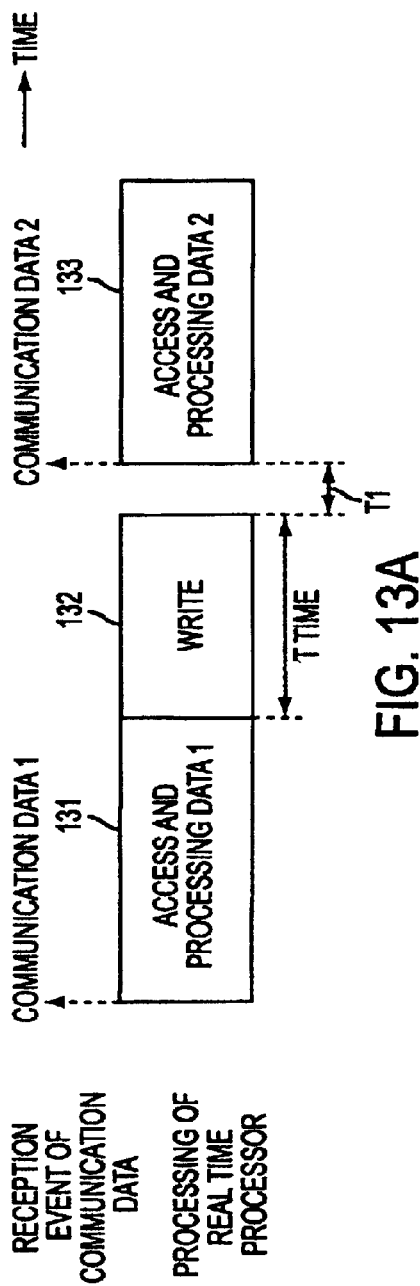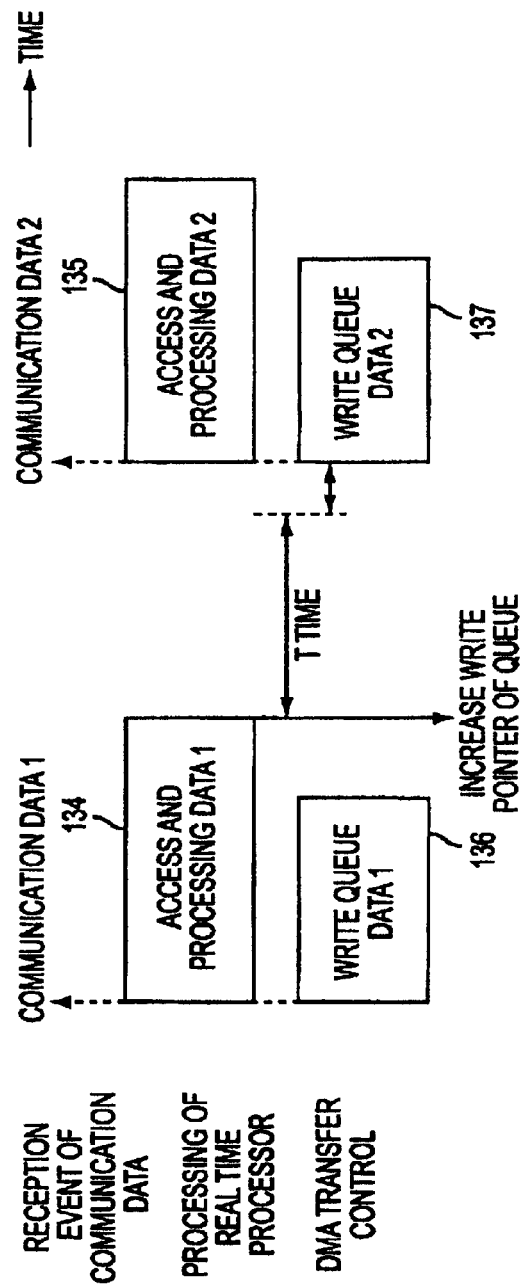

COMMUNICATIONS PROTOCOL PROCESSING BY REAL TIME PROCESSOR OFF-LOADING OPERATIONS TO QUEUE FOR PROCESSING BY NON-REAL TIME PROCESSOR

BACKGROUND OF THE INVENTION

1. Field of the Invention

The present invention relates to a communication protocol processing unit, which executes a communication protocol process such as ATM, SDH, or the like by a processor.

2. Description of the Related Arts

In order to process a high-speed communication protocol in the prior art, each process in the communication protocol such as ATM, SDH, or the like is performed by a hardware configuration (Hard Wired) in a generic technology.

For this reason, each time a standard recommended specification such as ITU-T, or the like or a small-scaled specification is changed and added, it is necessary to redesign a hardware structure, which has become a problem in view of technology and cost.

Furthermore, in order to avoid such the problem, when it is considered that a processor performs the high-speed communication protocol process, an enormous band width is required for a high performance in the processor.

In particular, in the case where a plurality of connection processes such as an ATM cell process are made to handle an enormous data amount at a high speed, the realizability was made difficult from processing capability, a required band width, or the like which is demanded for the processor in performing a processor processing.

FIG. 1 is a diagram for explaining such conventional problems by mentioning the ATM cell process as an example. In the case where for an ATM cell throughput of 600 Mbps through a memory function 4 such as a memory, or the like, all functions (cell discrimination, UPC, NDC, OAM, accounting, header change, etc.) on an ATM layer of the ITU-T recommendation is executed by a processor 1 based on instructions stored in an instruction memory 3, an enormous band width such as 10 Gbps or more 103 is required in a data transfer relative to a parameter 2 stored in a data RAM, or the like per cell process in the processor 1 in view of a handling data amount. FIG. 1 is shown with an input 101 for an ATM cell input of communication data at 600 Mbps and an output for an ATM cell of communication data at 600 Mbps. The processor 1 is performing ATM cell processing.

Furthermore, it was demanded that a processor would have to perform a processing within 1 cell time (680 ns), etc, but it became difficult to realize such the processor capable of corresponding to such the demand.

SUMMARY OF THE INVENTION

It is therefore an object of the present invention to provide a communication protocol processing unit capable of mitigating a necessary condition such as performance, a band width, or the like of the processor as a structural element, and performing a communication protocol process by the processor at lower costs as a whole.

According to the present invention attaining the above-described problems, a communication protocol processing unit formed by a multiprocessor has a first processor for performing a process demanding a real time property in a communication data stream; and a second processor for performing a process not demanding a real time property, wherein the first processor transfers to the second processor use parameters paired with communication data to be processed, and the second processor is configured so as to refer to the transferred communication data and parameters for processing.

Furthermore, in an preferred aspect of the communication protocol processing unit by the multiprocessor according to the present invention attaining the above-described problem, the communication protocol processing unit comprises a process queue for storing the pair of the communication data and parameters between the first and second processors.

Furthermore, in a preferred aspect of the communication protocol processing unit by the multiprocessor according to the present invention attaining the above-described object, the first processor is configured so as to generate a processing demand signal which demands a process to the second processor, before the first processor generates the process demand signal, the communication data and parameters have been previously unconditionally transferred to the process queue, and the process queue can display independently validity/invalidity of the data already transferred to the process queue according to presence or absence of the process demand signal from the first processor.

Furthermore, in a preferred aspect of the communication protocol processing unit by the multiprocessor according to the present invention attaining the above-described problem, a plurality of the first processors are provided, and are in series arranged to pipeline, and each of the plurality of first processors is demandable for processing to the second processor.

Furthermore, in a preferred aspect of the communication protocol processing unit by the multiprocessor according to the present invention attaining the above-described problem, the communication protocol processing unit further comprises a queue for storing processing results of the second processor between the first and second processors; and a selecting circuit as means for overwriting the communication data in the stream to the processing results of the second processor, wherein the first processor read-accesses the queue, and when the data are accumulated in the queue, the selection route of the selecting circuit is switched into a queue side.

The features of the present invention will become more apparent from the embodiments thereof set forth in light of the drawings.

BRIEF DESCRIPTION OF THE DRAWINGS

FIGS. 13A & 13B are diagrams showing the operational flowchart of FIG. 10;

DESCRIPTION OF THE PREFERRED EMBODIMENTS

Hereinafter, embodiments of the present invention will be described with reference to the drawings. Incidentally, the embodiments illustrated are for understanding of the present invention, and the application of the present invention is not restricted thereto.

Figure 2:
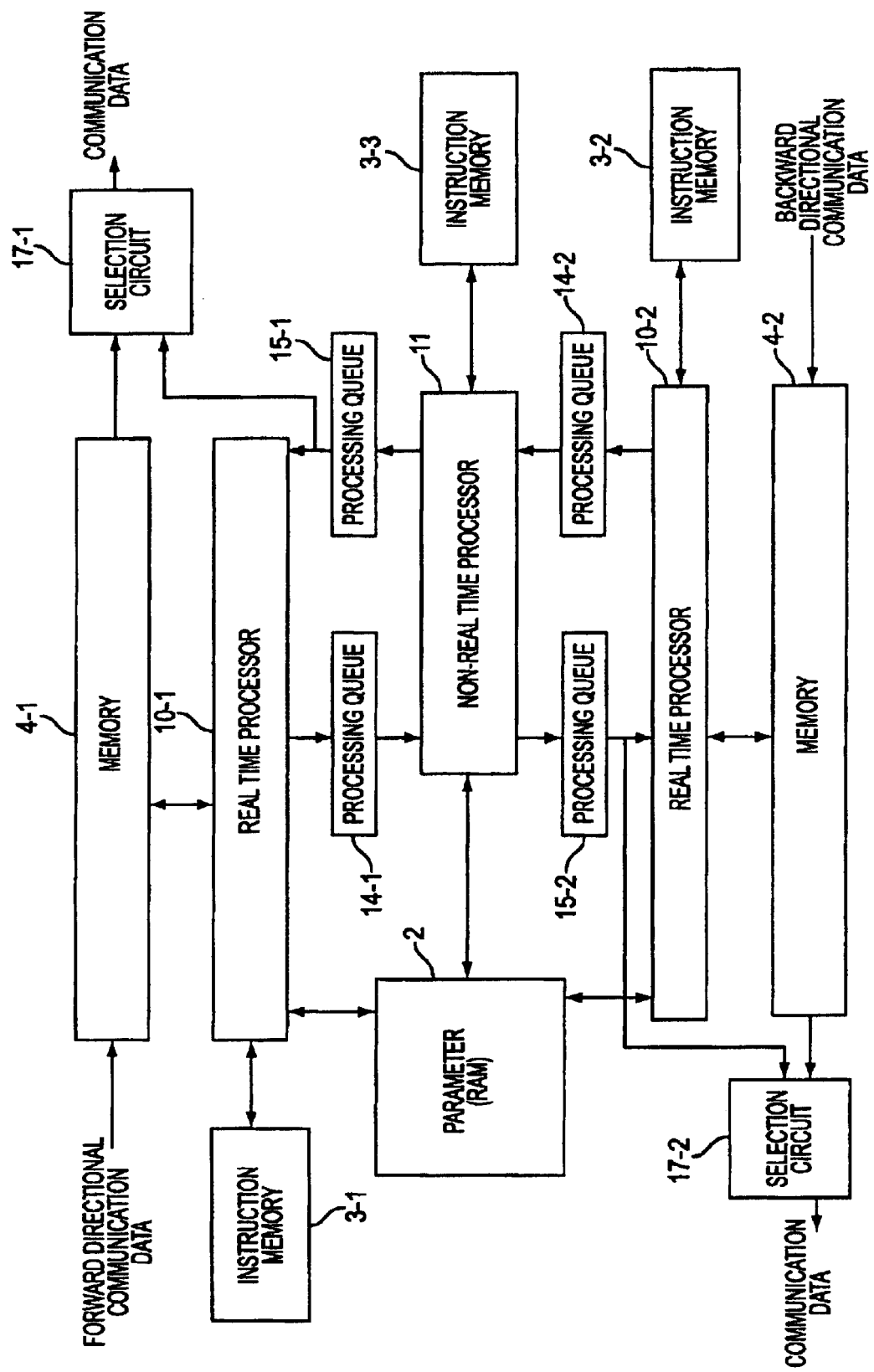
FIG. 2 is a block diagram showing the configuration of a first embodiment.
Figure 3:
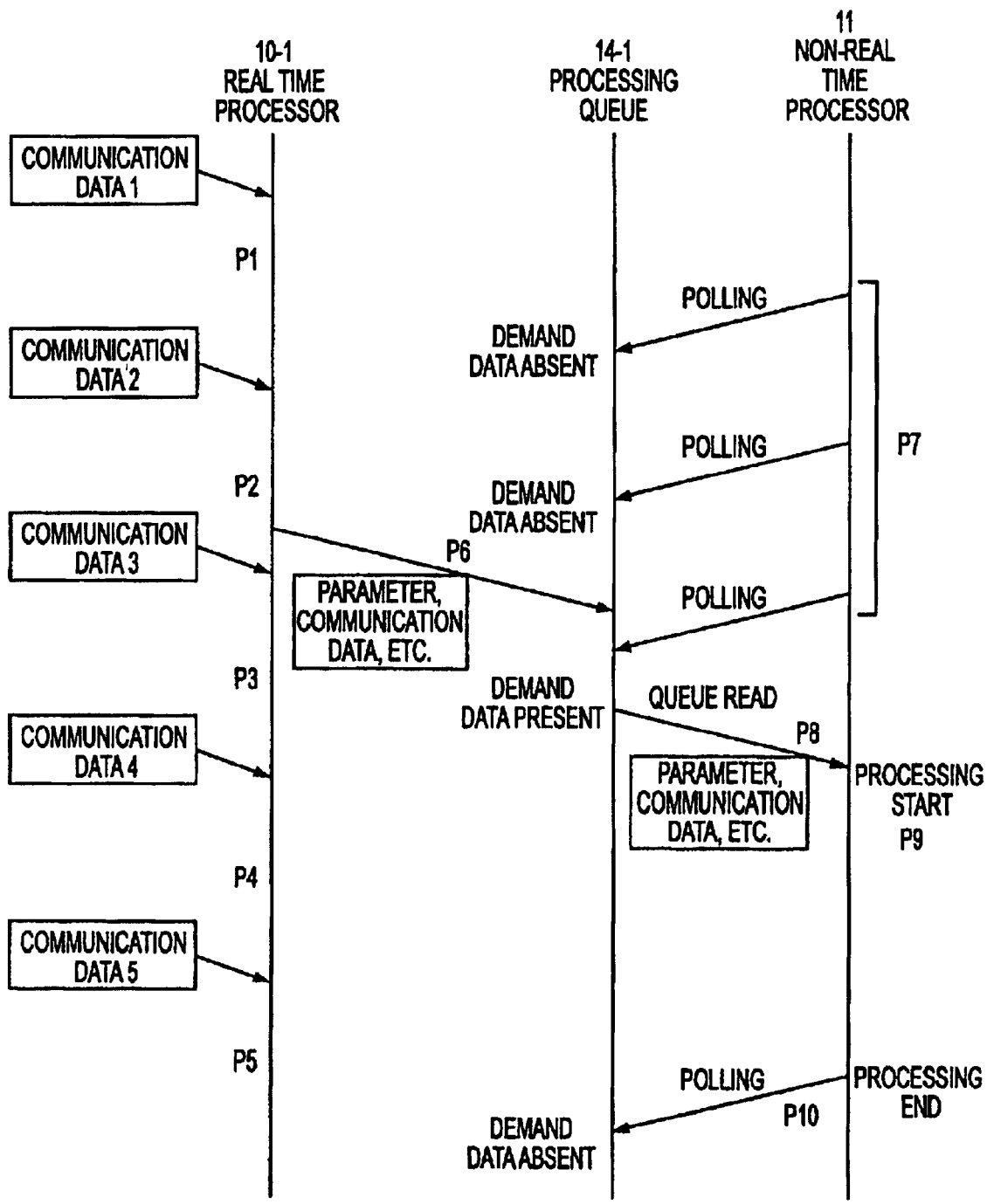
FIG. 3 is an operational sequence flow corresponding to the configuration of FIG. 2.
Figure 4:
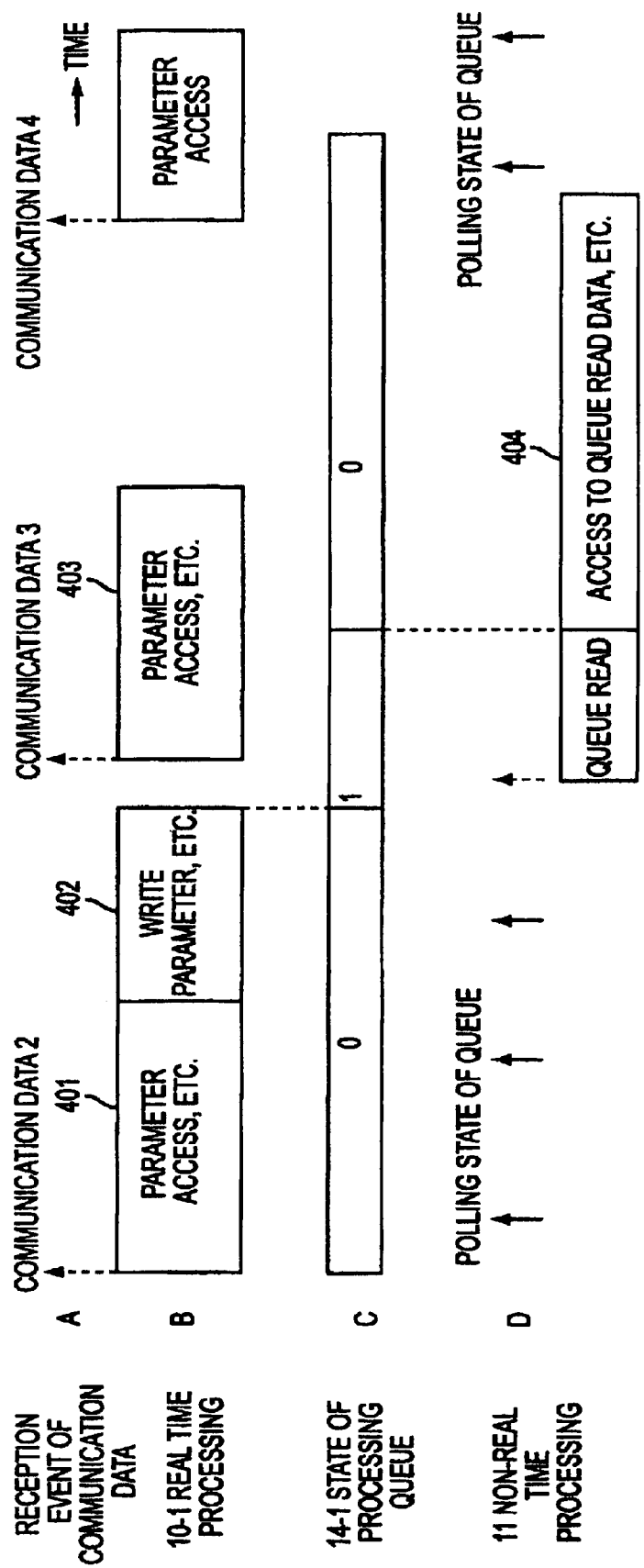
FIG. 4 is an operational time chart corresponding to the configuration of FIG. 2.

FIG. 2 is a structural block diagram according to a first embodiment of the present invention. FIGS. 3 and 4 are an operational sequence flow and an operational time chart in response to the configuration of FIG. 2, respectively.

In order to mitigate a necessary condition for performing a processor process, in the present invention, the process is partitioned into a processor needing a real time property and a processor not needing the real time property.

In FIG. 2, this embodiment includes a processor 10-1 (Real time processing processor) for performing in a forward process demanding the real time property and a processor 10-2 (Real time processing processor) for performing a backward process (10-1 and 10-2 hereinafter generically referred to as a real time processing processor 10); and a processor 11 for performing a process not demanding the real time property (hereinafter referred to as a non-real time processing processor 11).

In FIG. 2, instruction memories 3-1, 3-2, 3—3 are memories for storing instructions for the processors 10, 11, respectively. Memory 4-1 and 4-2 are a Memory function of a memory, etc.

In the case of dividing into the real time processing processor 10 and non-real time processing processor 11, when parameters are stored in a data RAM 2 (data Ram, etc.) or the like and accessed by both the processors, a contradiction of parameter values occurs due to a difference in respective processor processing times, and such a problem occurs.

Incidentally, here, the parameters are memory data required for a process excluding communication data, for example, state transitional information, statistical information, various setting information, and the like.

Figure 5:
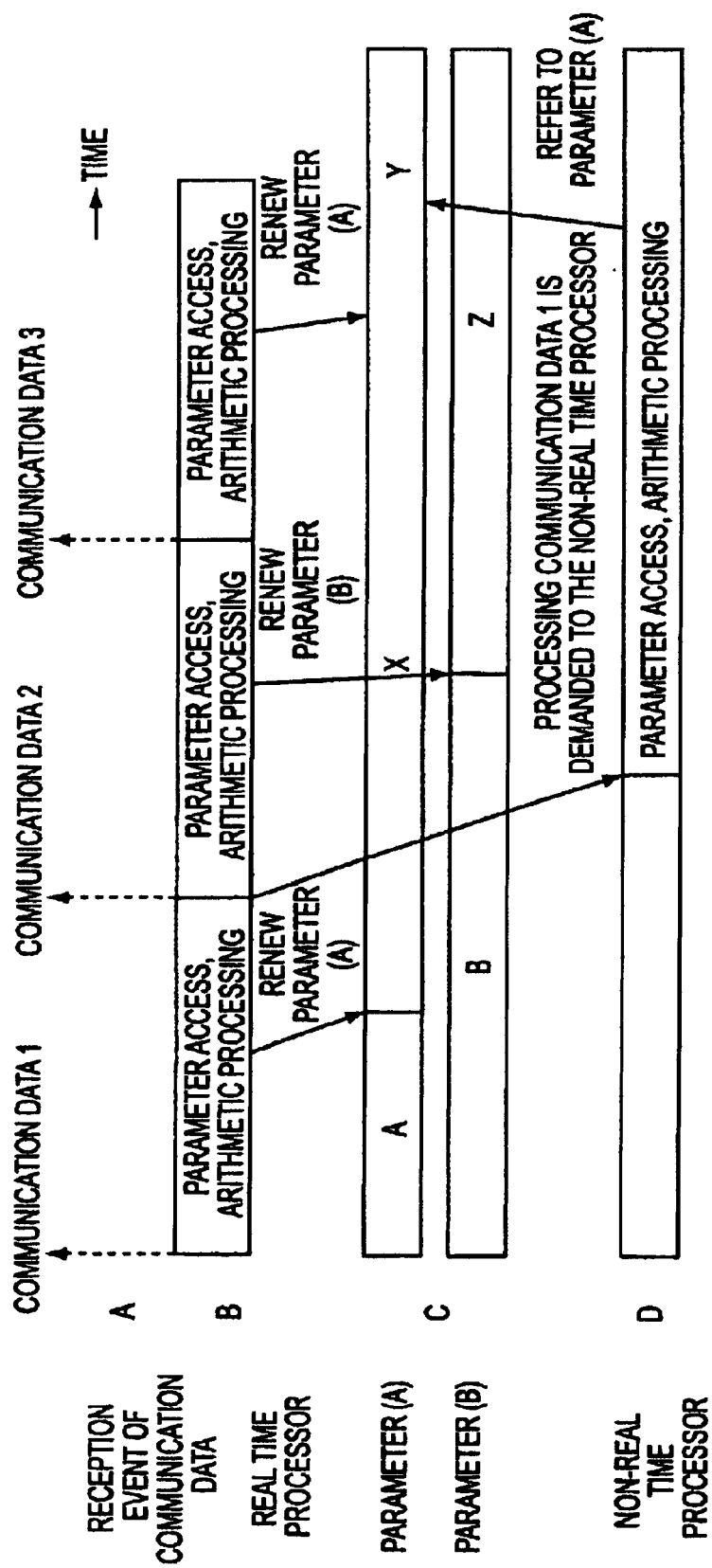
FIG. 5 is a diagram for explaining a contradiction of parameters.

FIG. 5 is a diagram for explaining a contradiction of such parameters.

In the case where a reception event of the communication data generates according to a time as in communication data 1, 2, 3 as shown in FIG. 5, the non-real time processing processor 11 needs to be processed with a value of parameters (A) as X when processing the communication data 1.

However, a renewal of the parameters (A) to Y with respect to the communication data 3 received later has been already made by the real time processing processor 10. Accordingly, when the non-real time processing processor 11 refers to renewal data X of the parameters (A), X has been already renewed to Y, and as this is referred to, a contradiction occurs.

Here, in FIG. 2, in order to avoid the occurrence of such contradiction, it is considered that the processings handle the parameters to be accessed by both the real time processing processor 10 and non-real time processing processor 11, and are owed only to a real time processing processor 10. However, this causes to increase the process load of the real time processing processor 10.

Accordingly, according to the present invention, the real time processing processor 10 generates, outputs, and processes a processing demand to the non-real time processing processor 11 as communication data, which are paired with parameters for use in both the processors 10, 11, and the pair is transferred to the non-real time processing processor 11.

The non-real time processing processor 11 processes by use of the transferred communication data and parameters for reference, and in such parameters, as not accessing memories such as a data RAM, or the like storing the parameters 2, it is possible to avoid a contradiction of the parameters to be accessed by both the processors 10, 11.

As it is possible to disperse the process to the processor 11, it is possible to decrease a band width or performance demanded for the processor to process the communication data.

Such situation will be explained by use of FIGS. 3 and 4. FIG. 3 shows an operational sequence between the real time processing processor 10-1 for performing forward communication data and the non-real time processing processor 11.

Each time each of the communication data 1, 2, 3, . . . is generated, the real time processing processor 10-1 accesses the parameters 2 in response to the instruction from an instruction memory 3-1, and performs an arithmetic process (processing steps P1, 2, 3, 4, 5). At step P1 there is parameter access and arithmetic processing. Step P2—parameter access, arithmetic processing, process demand generation and queue write. Step P3—parameter access and arithmetic processing. Step P4—parameter access and arithmetic processing. Step P5—parameter access and arithmetic processing.

When queue write data are generated (at the time of the processing step P2 of the communication data 2 in FIG. 3), the parameters, communication data, or the like are written into a process queue 14-1 (process step P6). In FIG. 4, after the real time processing processor 10-1 processes the communication data 2, a status of the process queue 14-1 is changed to "1."

On the other hand, the non-real time processing processor 11 makes periodically a polling to the process queue 14-1

(process step P7). When demand data exist in the process queue 14-1 in a process of the polling, the non-real time processing processor 11 reads contents of the queue (process step P8), and performs an arithmetic process (process step P9 Parameter access and arithmetic processing).

Figure 1:
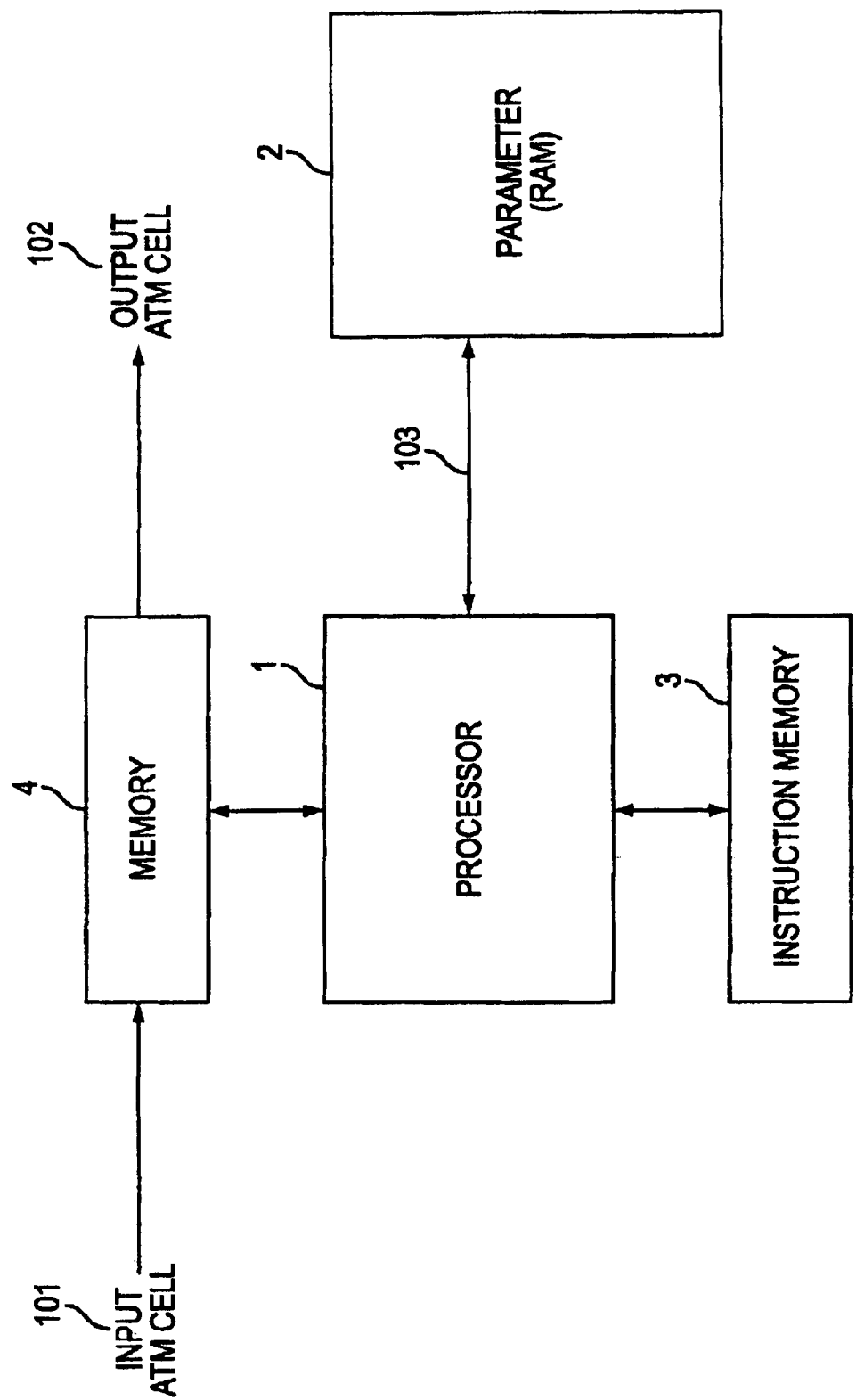
FIG. 1 is a diagram showing a conventional example in the case where an ATM cell process is performed by a processor.
Figure 10:
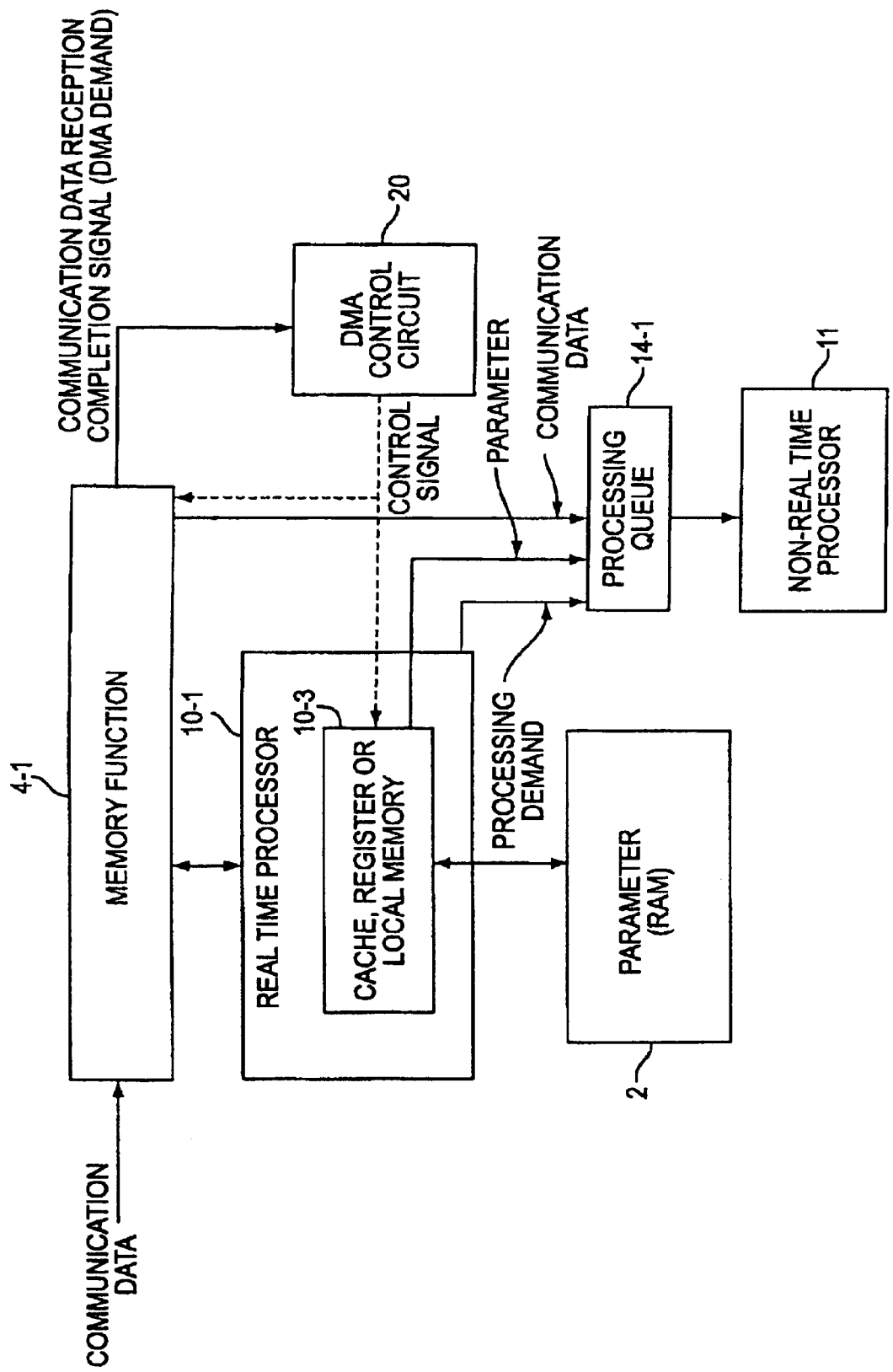
FIG. 10 is a diagram showing an example according to a second embodiment of the present invention.

When this arithmetic process is ended, the polling restarts (processing step P10). At this time, a status of the processing queue 14-1 is changed to "0." In FIG. 4, 10-1 shows processing of real time processing an 11 shows the processing of non-real time processing processor. Box 401 shows parameter access, access to communication data 1, and arithmetic processing. 402 shows write parameter access, access to communication data 2 and arithmetic processing. Designator 404 shows access to queue read data, parameter access, arithmetic processing.

Figure 6:
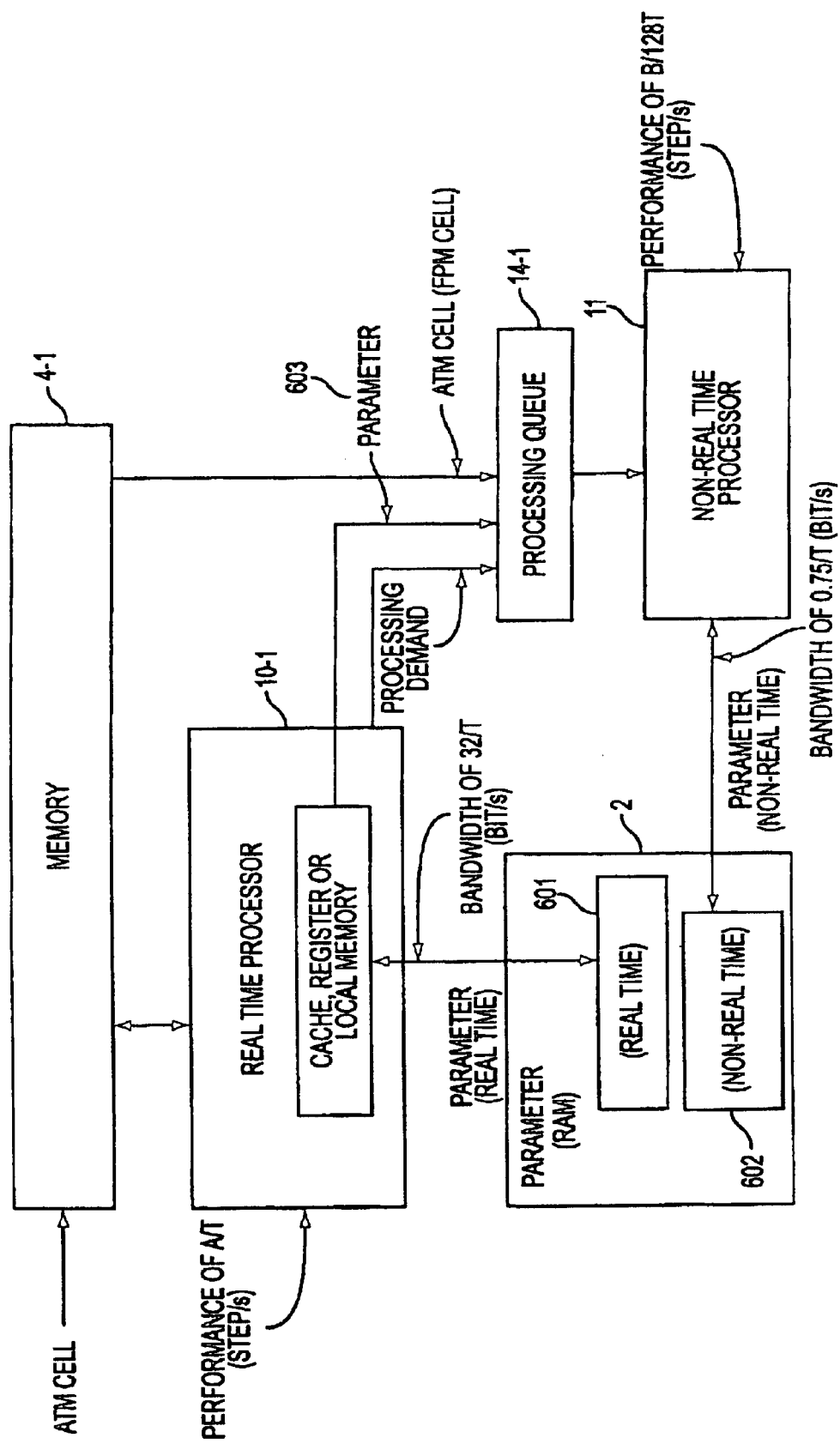
FIG. 6 is a diagram for explaining the case where the configuration of FIG. 2 according to the embodiment of the present invention is applied to a performance monitoring processing (ITU-T recommendation I.610) in the ATM cell processing.
Figure 7:
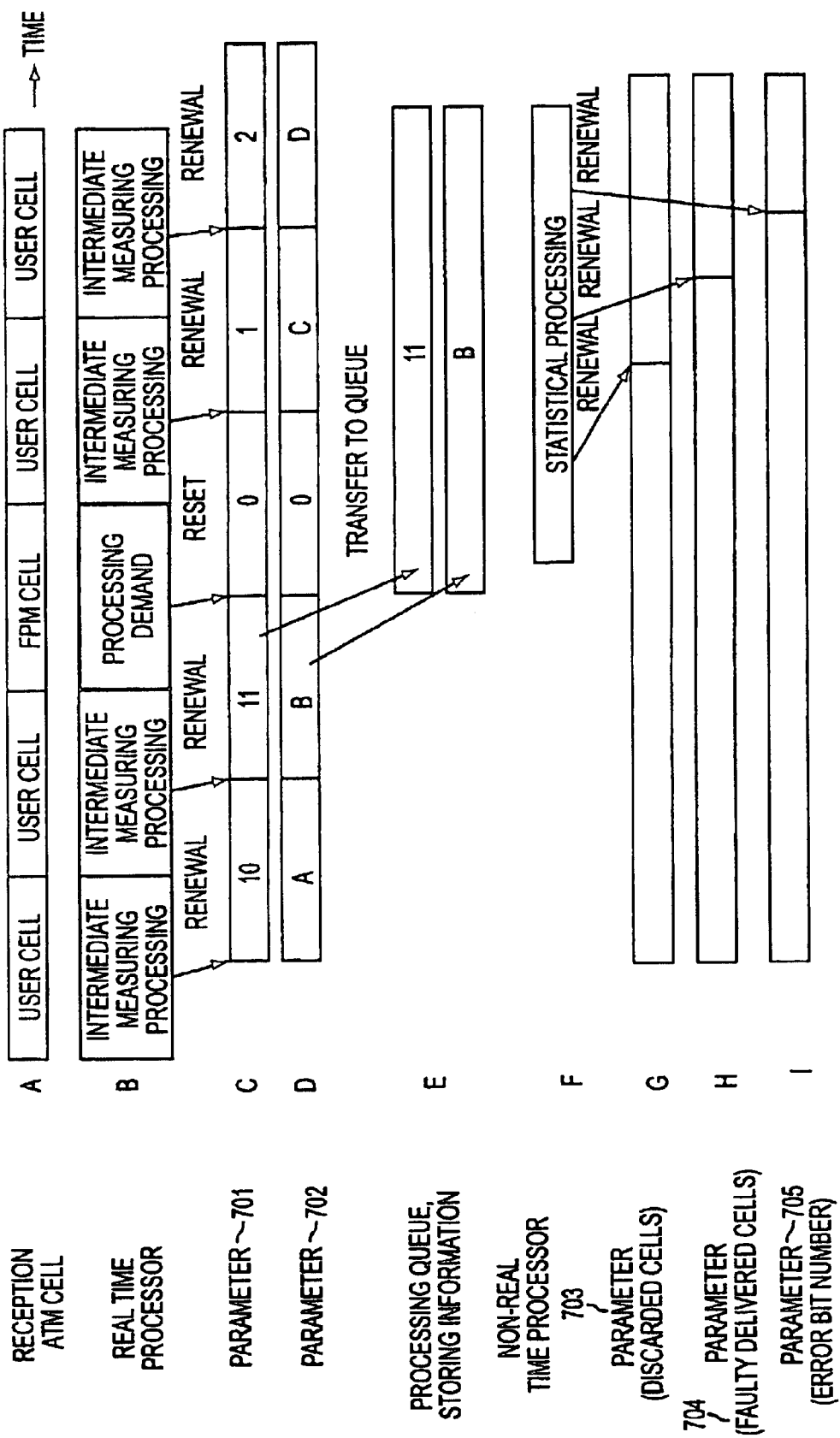
FIG. 7 is an operational time chart of FIG. 6.

FIG. 6 is a diagram for explaining the case where the configuration of FIG. 2 applies to a performance monitor process (ITU-T recommendation I.610) in the ATM cell process according to the first embodiment of the present invention. FIG. 7 is an operational time chart of FIG. 6. FIG. 6 shows a configuration of only a reception side of the ATM cell for brevity of the description, and further the instruction memory is not shown. In FIG. 6, 4-1 shows a memory, a function of a memory, etc. (storing reception ATM cell). 10-1 shows the real time processing processor (execution of intermediate planned processing). Item 2 is the parameter ram (data, ram, etc.). Non-real time processing processor 11 shows the execution of statistical processing and performance of B/128*t*.

Figure 8:
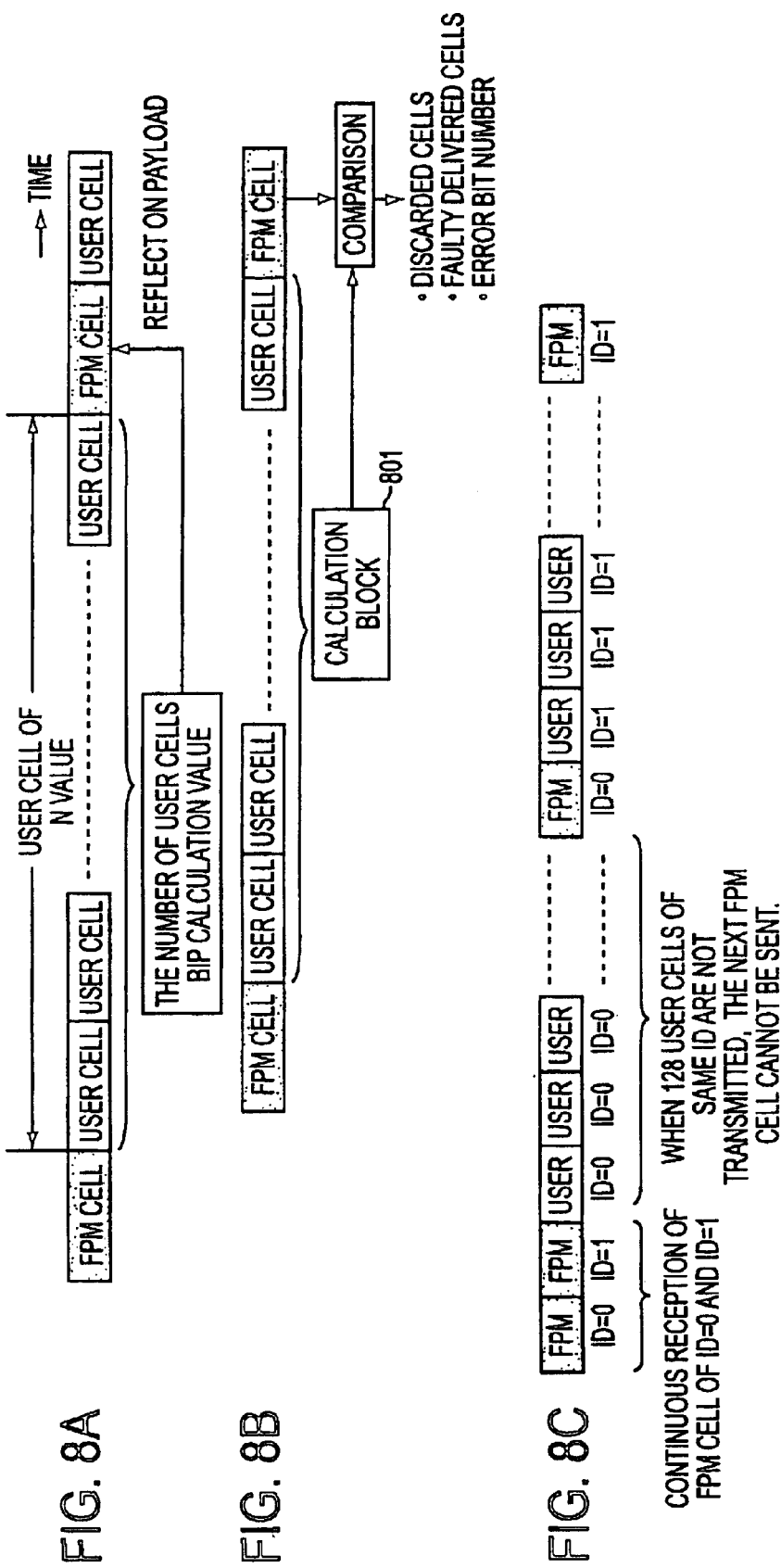
FIGS. 8A to 8C are diagrams for explaining a sense of the performance monitoring processing in the ATM cell processing.

The sense of the performance monitor process in the ATM cell process is as shown in FIGS. 8A to 8C. FIGS. 8A and 8B show a cell flow for one connection. FIG. 8A shows the cell flow from an ATM cell transmission side. N pieces of user cell having minimum 128 pieces are continued, and after the N pieces of user cell, the number of user cells and calculated parity (BIP: Bit Interleaved Parity) are annexed to a payload of FPM (Forward Performance Monitoring) for transmission. N is minimum 128 by ITU-T provision.

FIG. 8B is an ATM cell flow to be received at an ATM cell reception side. The number of user cells received is counted, and a parity is acquired. In calculation block 801, the number of received user cells and BIP calculation. Furthermore, the payload of the succeeding FPM (Forward Performance Monitoring) cells is annexed to the number of user cells and parity at the transmission side for comparison. Thus, the number of discarded cells, the number of faultily delivered cells, and the number of error bits when received are judged.

FIG. 8C (ATM cell flow) shows the ATM cell flow when aiming at a plurality of connections. A connection ID is assigned to the cells configured in each frame. The number of user cells received is counted in each connection, and a BIP-16 arithmetic process is performed for a payload region of the user cells of the corresponding connection ID (hereinafter referred to as an intermediate measuring process).

Next, based on results of the intermediate measuring process of the user cells flowing between the reception FPM cells, it is possible to realize a performance monitoring function by collecting the statistics of the number of discaded cells, the number of faultily delivered cells, and the number of error bits (hereinafter referred to as a statistical process).

Incidentally, a transmission interval of the FPM cells are provided in the ITU-T recommendation I.610 (FIG. 8C) and is defined as a transmission of 1 cell in each minimum 128 cells.

Returning to FIG. 6, the above intermediate measuring process is assigned to the real time processing processor 10-1, and the statistical process is assigned to the non-real time processing processor 11. In this case, the parameters 2 required for the real time processing processor 10-1 are ① the number of reception user cell count; and ② BIP-16 calculation values. This is shown as item 601 (the number of received user cells and BIP calculation value) The parameters 2 required for the non-real time processing processor 11 are ① the number of reception user cell count; ② BIP-16 calculation values; and additionally ③ the number of discarded cells; ④ the number of faultily delivered cells; and ⑤ the number of error bits. This is shown as item 602. Parameter 603 is the number of received user cells as BIP calculation value.

The parameters mentioned here are ones for both the reference and renewal, and in addition, the parameters for only reference exist, and as they do not have direct connection with the present invention, the description is omitted.

As described above, ① the number of reception user cell count; and ② the BIP-16 calculation values are parameters required for both the real time processing processor 10-1 and non-real time processing processor 11.

When receiving the user cells (FIG. 7*a*), the real time processing processor 10-1 renews the parameters of ① the number of reception user cell count; and ② the BIP-16 calculation values as the intermediate measuring process (FIG. 7*b*) (FIGS. 7*c* and 7*d*).

Furthermore, when receiving the FPM cells, the parameters of ① the number of reception user cell count 701; and ② the BIP-16 calculation values (parameter 702 BIP calculation value) are transferred to the non-real time processing processor 11 (or the process queue 14-1) together with the reception FPM cell (FIG. 7*e*), and these parameters are reset (FIGS. 7*c* and 7*d*).

The non-real time processing processor 11 statistically processes the transferred parameters of ① the number of reception user cell count; and ② the BIP-16 calculation values, and uses the FPM reception cells to calculate ③ the number of discarded cells, ④ the number of faultily delivered cells, and ⑤ the number of error bits (FIG. 7*f*).

Continuously, the parameters of by ③ the number of discarded cells (parameter 703), ④ the number of faultily delivered cells (parameter 704), and ⑤ the bits which are calculated are renewed (parameter 705 error bit number) (FIGS. 7*g*, 7*h*, and 7*i*).

Hereinabove, it is possible to disperse the performance monitoring process (ITU-T recommendation I.610) in the ATM cell process to the real time processing processor 10-1 and non-real time processing processor 11.

Figure 9:
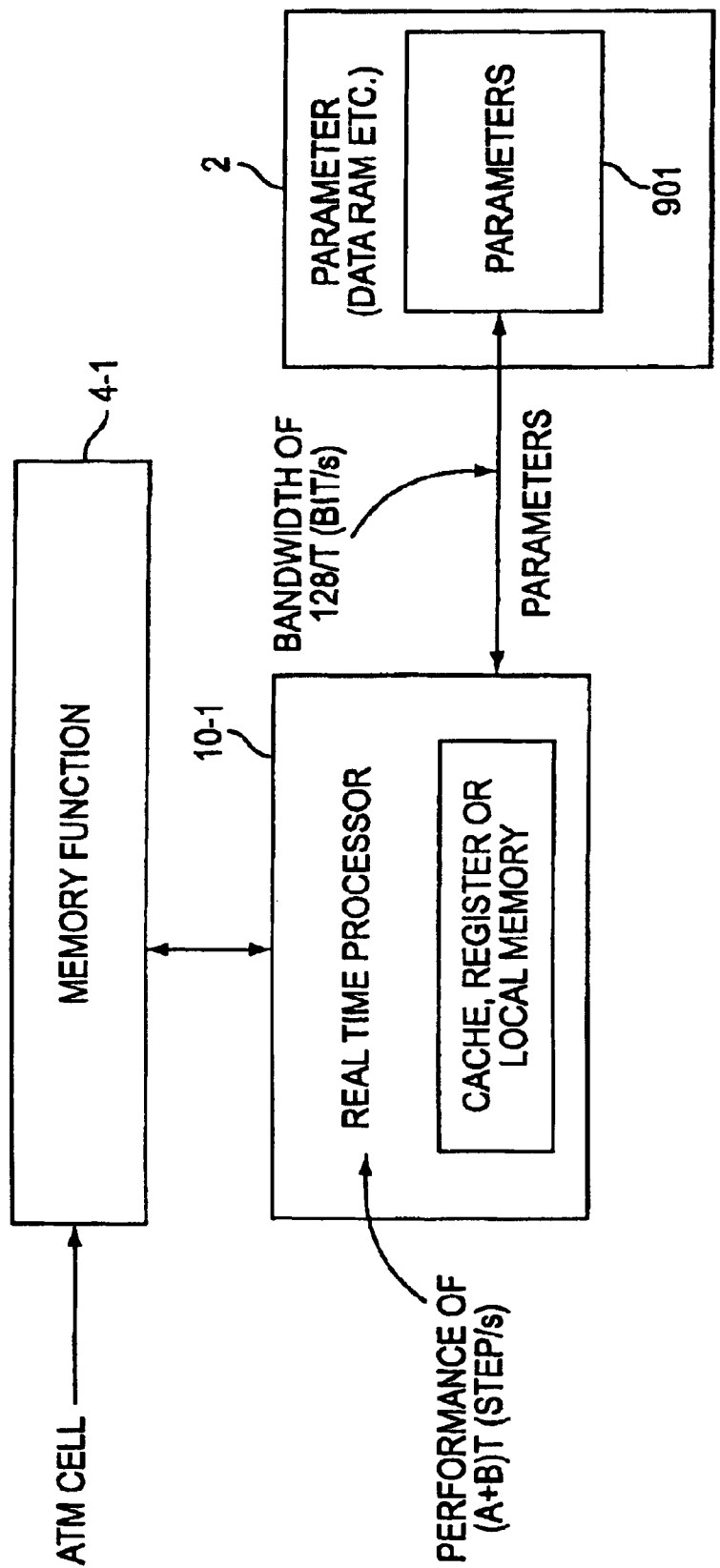
FIG. 9 is a diagram showing the conventional example of the performance monitoring processing in the ATM cell processing.

Thus, as effects, in the case where in a throughput of the ATM cell flow, 1 cell time=T;

the number of program processing execution step of the intermediate measuring process: A;

the number of program processing execution step of the statistical process: B;

the parameters of ① the number of reception user cell count, and ② the BIP-16 calculation values: 16 bits each; and the parameters of ③ the number of discarded cells, ④ the number of faultily delivered cells, and ⑤ the error bits: 32 bits each, in the case where the configuration of the conventional example shown in FIG. 1 is adapted for the performance monitoring process in the ATM cell process, as shown in FIG. 9, a band width (bit/s) required for the processor 10-1 is set to 128/T (=(16×2+32×3)/T), and a performance (step/s) required for the processor 10-1 is set to (A+B)/T.

On the other hand, as, with the configuration according to the present invention, a reception interval of the FPM cells is once per 128 cells, the band width required for the real time processing processor 10-1 is set to 32/T (=(16×2)/T), and the band width required for the non-real time processing processor 11 is set to 0.75/T (=(32×3)/128T), and the performance required for the real time processing processor 10-1 is set to A/T, and the performance required for the non-real time processing processor 11 is set to B/128T. In FIG. 9 the memory function 4-1 represents a memory, etc. or the like for storing reception ATM cells. The parameters 901 in the parameter ram (data ram etc.) represent the number of received user cells, BIP calculation value, the number of discarded cells, the number of faulty delivered cells, and error bit number. Process 10-1 represent the execution of intermediate measuring processing and statistical processing.

As the results, the performance required for the processor and the necessary band width can be decreased. Incidentally, the handling parameters are actually more than those mentioned in the above example (in particular, the statistical parameters), and it is apprehensible that effects of the present invention become further larger.

Furthermore, as shown in FIG. 8C, in the case where the performance monitoring is performed to a plurality of connections, the non-real time processing processor 11 retains the communication data and parameters which are transferred from the real time processing processor 10-1. This embodiment includes the processing queue 14-1 to the non-real time processing processor 11.

Thus, even if the FPM cells are continuously received and the process of the non-real time processing processor 11 is continuously demanded, they have only to be stored in the queue 14-1. The need for increasing the processing capability of the processor does not occur.

In the performance monitoring process, in order to transmit the FPM cells in each transmission of minimum 128 user cells in each connection, the FPM cells of the plurality of connections are continuously received, and even if the process of the non-real time processing processor 11 is continuously demanded, in the case where the FPM cells are next received to demand the process of the non-real time processing processor 11, the demand is after 128 cells at a minimum (refer to FIG. 8C).

Accordingly, with the provision of the process queue 14-1 (the number of stages is set to be the number of FPM cells or over which are continuously received), the statistical process has only to end within a 128-cell time, and it is not necessary that the processing capability of the non-real time processing processor 11 is increased.

As mentioned above, according to the present invention, the real time processing and non-real time processing processor 10, 11 are provided. The parameters to be used by both the processors (the memory data to be used for processes excluding the communication data) are transferred to the non-real time processing processor 11 in pairs with the communication data to be processed.

As the non-real time processing processor 11 performs the statistical process for use in the transferred communication data and parameters for reference, no contradictions in the parameters by both the processor processing times occur. Accordingly, the process can be dispersed to the real time processing processor 10 and the non-real time processing processor 11, and it is possible to mitigate necessary conditions such as performance, band widths, or the like of the processor configuring a system.

According to the present invention, it is possible to construct the communication protocol processing unit in which the communication protocol process is performed by the processor at lower costs as a whole.

Furthermore, according to the present invention, when the real time processing processor 10 demands the process to the non-real time processing processor 11, the necessary data are only written into the queue 14-1 as a process demand. Therefore, taking into consideration occurrence frequencies of the processing demand, the non-real time processing processor 11 can reduce the processing capability down to such a degree that an overflow of the queue 14-1 does not generate. Furthermore, it is possible to process the communication data which were continuously received without a disorder of a communication data stream.

FIG. 10 is a diagram showing a second embodiment of the present invention, indicating only a part in which the communication data and parameters are transferred to the processing queue 14-1. According to the second embodiment of FIG. 10, a DMA control circuit 20 is further provided so as to control a data transfer of a local memory 10-3 such as a cash, a register, or the like of the memory 4-1 and the real time processing processor 10-1. Memory function 4-1 represents memory, etc. and storing communication data.

Figure 11:
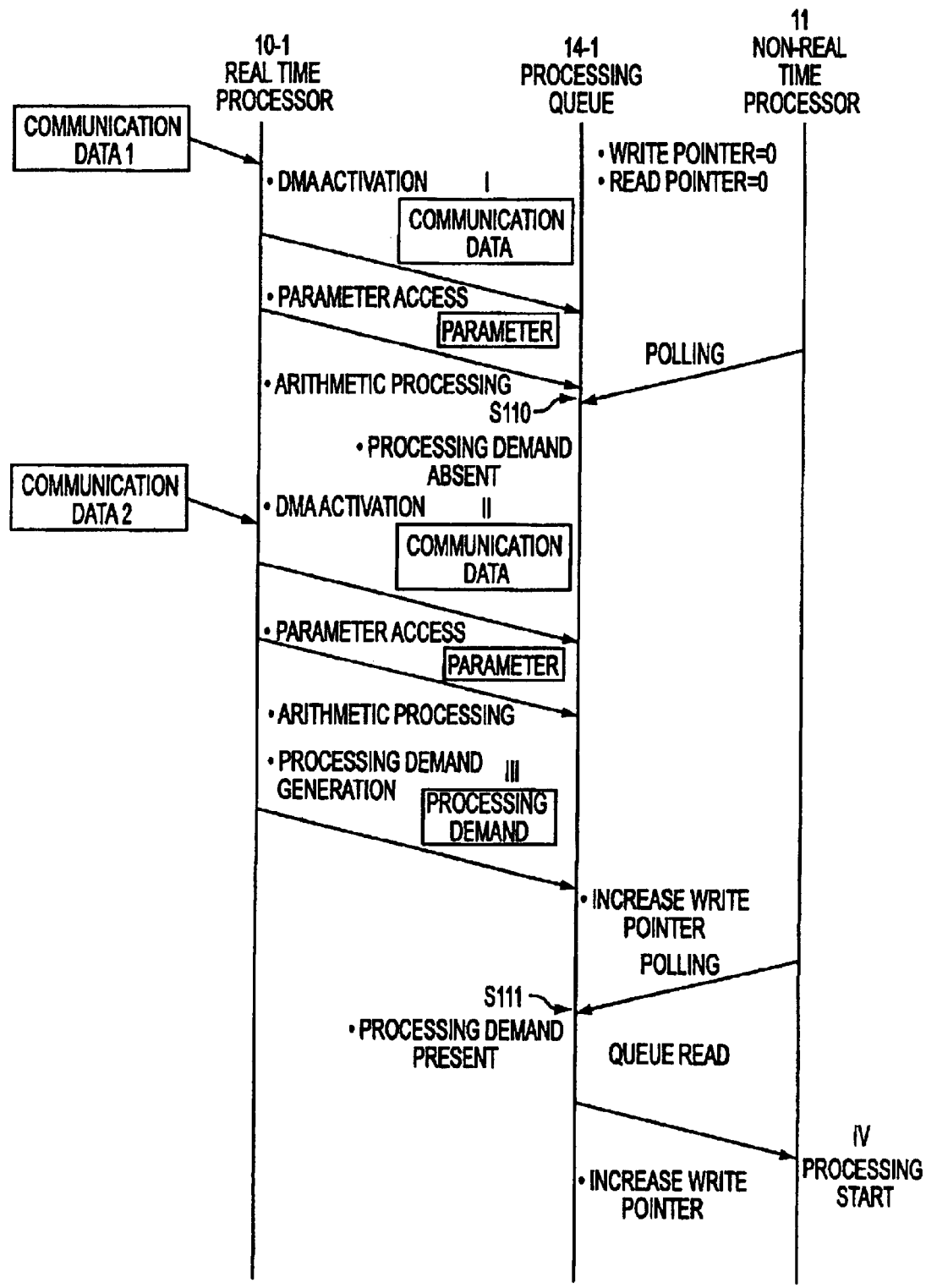
FIG. 11 is a diagram showing an operational sequence according to the embodiment of FIG. 10.
Figure 12:
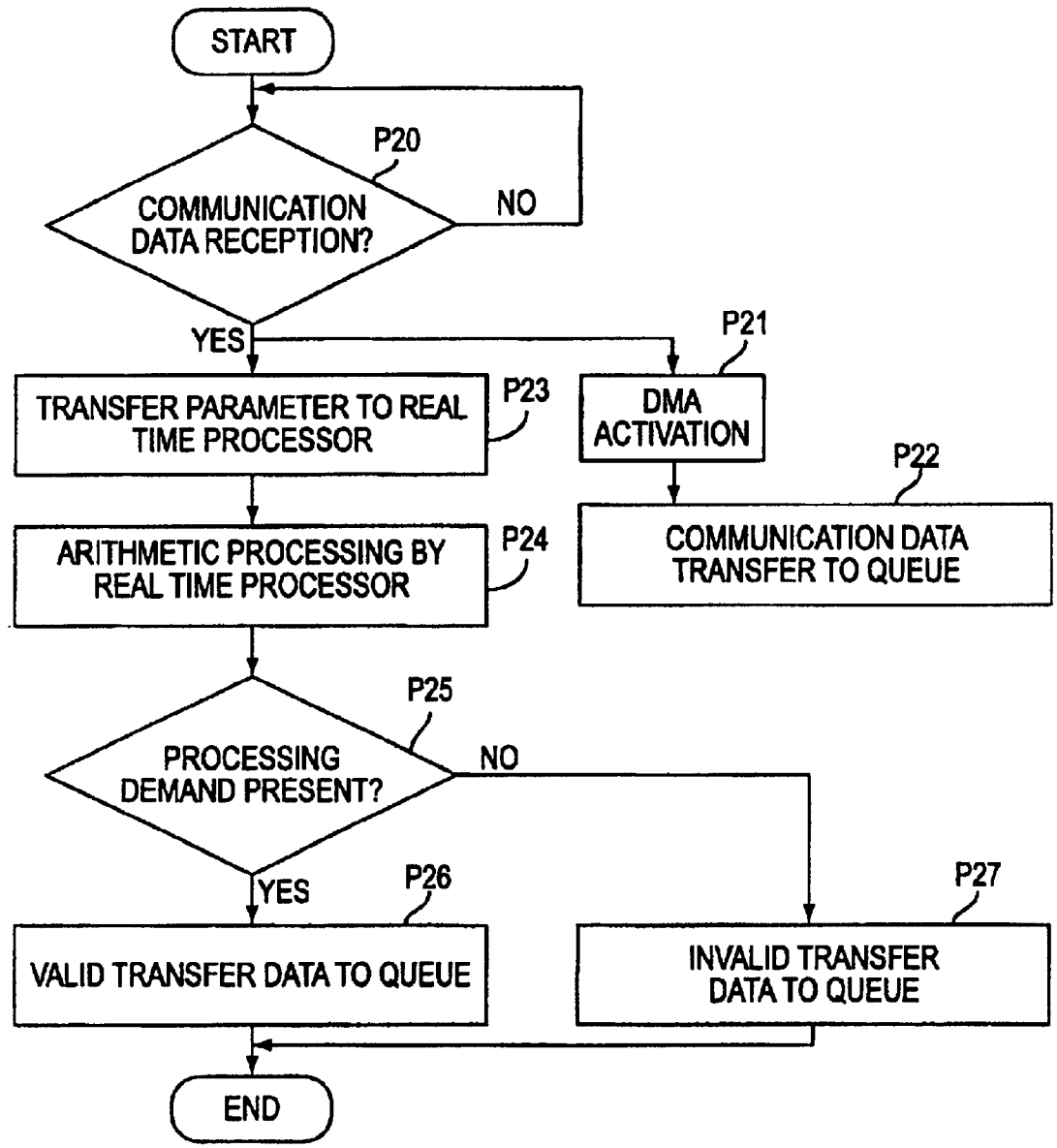
FIG. 12 is a diagram showing an operational flowchart of FIG. 10.

FIG. 11 shows an operational sequence according to the second embodiment of FIG. 10. Furthermore, FIG. 12 shows an operational flowchart, and FIG. 13 shows an operational time chart.

According to the second embodiment, when the real time processing processor 10-1 receives the communication data, the processor 10-1 activates the DMA control circuit 20, and further accesses the parameters 2, and before the processor 10-1 demands the process of the communication data and parameters to the non-real time processing processor 11, the processor 10-1 first unconditionally transfers the communication data and parameters to the process queue 14-1 (refer to I and II of FIG. 11).

In the example of FIG. 11, in this case, the communication data 1 are not demanded for the process to the non-real time processing processor 11, and the communication data 2 are demanded for the process. Accordingly, when the process is demanded by the arithmetic process with respect to the communication data 2, the demand for the process is notified to the process queue 14-1 (refer to III of FIG. 11). At S110 processing demand is absent (write pointer equals read pointer). At S111 the processing demand is present (write pointer not equal to read pointer) and a queue read occurs (parameter, communications data).

The management of the process queue 14-1 is executed by a write pointer and a read pointer. When the process is demanded, the write pointer is increased, and the non-real time processing processor 11 polls these pointers, and it is recognized that valid data are stored in the processing queue 14-1 according to disagreement of the write pointer with the read pointer.

In the case where it is recognized that the valid data are stored in the processing queue 14-1, the non-real time processing processor 11 increases the read pointer, and starts the processing (parameter access and arithmetic processing) (refer to IV of FIG. 11).

FIG. 12 is a detailed operational flowchart in response to the operational sequence of FIG. 11. The real time processing processor 10-1 monitors the memory 4-1, and judges presence or absence of reception of the communication data (processing step P20). When the processor 10-1 receives the communication data (processing step P20; Yes), the processor 10-1 activates the DMA control circuit 20 (processing step P21).

When the processor 10-1 activates the DMA control circuit 20, the processor 10-1 controls to transfer the communication data and parameters to the processing queue 14-1 (processing step P22 parameter transfer).

On the other hand, when the real time processing processor 10-1 receives the communication data (processing step P20; Yes), the processor 10-1 is transferred the parameters 2 (processing step P23), and performs the arithmetic processing (processing step S24).

As the results of this processing, if the processing is demanded (processing step P25; Yes), the write pointer of the processing queue 14-1 is increased (processing step P26 increase queue write pointer). On the other hand, if the processing is not demanded at processing step P25, the transfer of the communication data to the processing queue 14-1 is invalidated, the write pointer is not increased (processing step P27 not renew value of queue write pointer).

FIGS. 13A & 13B are diagrams for explaining effects of the embodiment of FIG. 10. In FIG. 13A, after the communication data are performed the arithmetic process, the parameters and communication data are written into the processing queue 14-1. Specifically, access and processing block 131 include parameter access, access to communication data 1, arithmetic processing. Write block 132 includes write parameter and communication data 1 to the queue. Access data to and arithmetic processing block 133 includes parameter access, access to communications data 2, arithmetic processing T1 is the surplus time until processing of a next communication data has started execution.

On the contrary, in the processing of FIG. 13B in response to the embodiment of FIG. 10, at the same time as the communication data are received, the parameters and communication data are transferred to the processing queue 14-1 by the DMA control circuit 20. In FIG. 13B access and processing data 1 shows the parameter access, access to communications data 1, arithmetic processing. Accessing and processing data 2 135 shows the parameter access, access to communications data write parameter and communication data 1 to the queue. Write queue data 2 137 includes write parameters and communications data 2 to the queue.

Accordingly, in comparison with FIG. 13A, it is possible to decrease a transfer time (T) of the communication data and parameters, and to enhance the throughput of the communication data in proportion to the decrease time.

In this manner, according to the embodiment of FIG. 10, before the real time processing processor 10-1 demands the processing to the non-real time processing processor 11, the data required for the non-real time processing processor 11 have previously been transferred to the queue 14-1. For this reason, even if the handling communication data amount is enormous, it is possible to shorten a time from the occurrence of processing demands to the completion of the data transfer. It is possible to enhance the throughput of the communication data in proportion to this shortened time, or to reduce performance of the processor.

Here, according to the embodiment of FIG. 10, when the communication data are received not via the processor with the reception of the communication data as an event, the communication data are directly transferred to the processing queue 14-1 in the DMA transfer. For this reason, a separate data bus from a bus provided between the processor 10-1 and the communication data storing memory 4-1 is provided to make the data transfer, so that a load of the processor 10-1 can be decreased.

In the case where, for example, the ATM cell is assumed as the communication data, they forms an enormous data transfer of 53 bytes, and it is seemed that a load of the processor 10-1 is increased, but according to the present invention, since the processing of the processor 10-1 is independent of the transfer of the ATM cell, the load of the processor 10-1 can be decreased.

Figure 14:
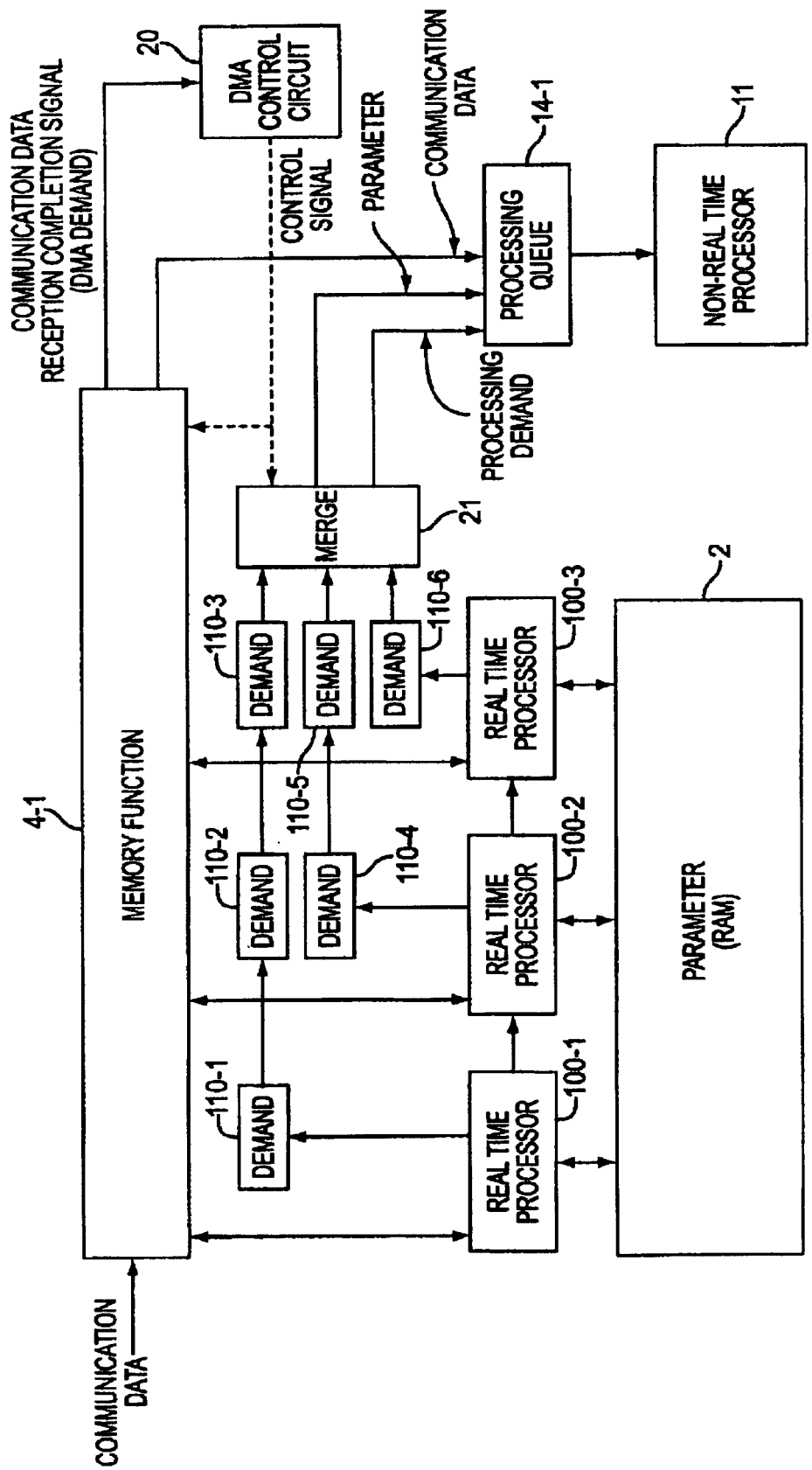
FIG. 14 is further a diagram showing a configuration according to a third embodiment.

FIG. 14 is a diagram showing a configuration according to a third embodiment. Demand blocks 110-1 to 11-6 are a processing demand. In the third embodiment, in the case where there are very many processings demanding a real time property, or in the case where a single real time processing processor 10-1 cannot fully process, in this configuration, a plurality of real time processing processors 100-1 to 100-3 are in series arranged to pipeline-process.

In this case, it is assumed that there is a problem that a write contention into the processing queue is generated by the plurality of real time processing processors 100-1 to 100-3, or that write data are made redundant (in particular, when demanding the processing for the same communication data).

To cope with the above, according to the present invention, the processing demands are forwarded to the latter step processor (processing demands 110-1 to 110-3, processing demands 110-4 to 110-5), and are finally collected by a merge circuit 21 to form one body, thereby generating the processing demand.

Accordingly, the write contention into the processing queue by the plurality of real time processing processors 100-1 to 100-3 is not generated. Concurrently, a redundancy of the write data is not generated.

Furthermore, before the processing demands are forwarded to the latter step processor and collected finally to set as one body, thereby generating the processing demand, when the communication data (occasionally together with the parameters also) are transferred to the processing queue 14-1, in the same manner as in the embodiment of FIG. 10, it is possible to decrease the transfer time of the communication data, and to enhance the throughput of the communication data in proportion to the decreased time.

Here, in FIG. 14, since the plurality of real time processing processors 100-1 to 100-3 forward the processing demands to transfer to the processing queue 14-1, it is not necessary that forwarding memory functions 110-1 to 110-6 are provided with the same capacity with respect to all the real time processing processors 100-1 to 100-3.

That is, each processor accumulates the processing demands, whereby it is possible to decrease the capacity of the forwarding memory functions in the pre-step processor and a forwarding signal number.

Figure 15:
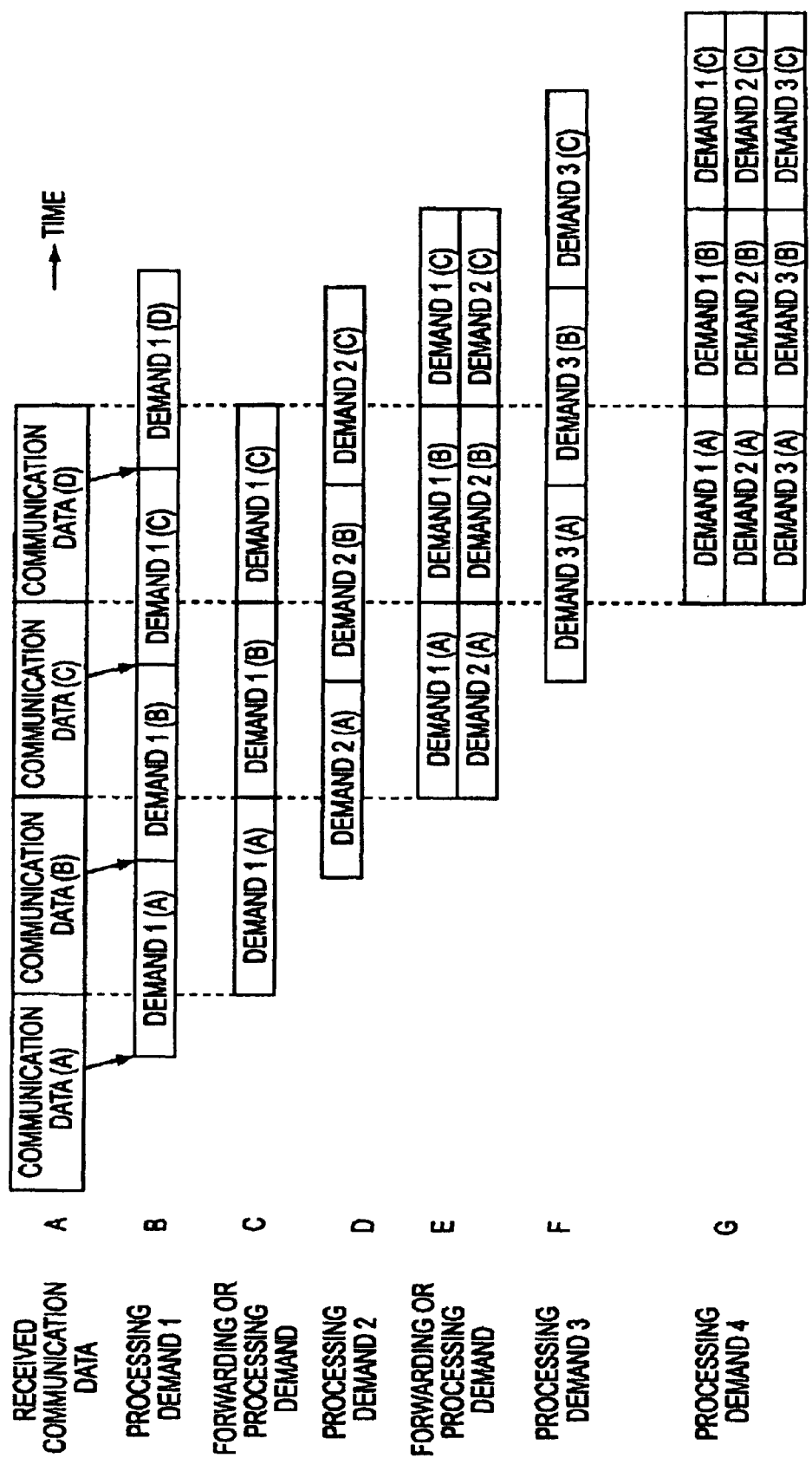
FIG. 15 is a diagram for explaining a process of a processing demand of FIG. 14.

FIG. 15 is a diagram for explaining such a process of the processing demands of FIG. 14. In FIG. 15, for the received communication data a, the real time processing processor 100-1 generates a processing demand 1 (refer to FIG. 15*b*). Accordingly, the processing demands forwarded from the real time processing demand processor 100-1 to the real time processing demand processor 100-2 are shown in FIG. 15*c*.

On the contrary, the real time processing demand processor 100-2 generates a processing demand 2 (refer to FIG. 15*d*). Accordingly, the processing demands forwarded from the real time processing demand processor 100-2 to the real time processing demand processor 100-3 are shown in FIG. 15e, collecting the processing demands forwarded from the real time processing demand processor 100-1.

Furthermore, the real time processing demand processor 100-3 generates a processing demand 3 (refer to FIG. 15f). Accordingly, the processing demands sent from the real time processing demand processor 100-3 to the merge circuit 21 are shown in FIG. 15g (processing demand 4, processing demand to non-real time processing processor), collecting the processing demands forwarded from the real time processing demand processor 100-2.

In this manner, each processor accumulates the processing demands, whereby it is possible to decrease the capacity of the forwarding memory functions in the pre-step processor and the forwarding signal number.

Figure 16:
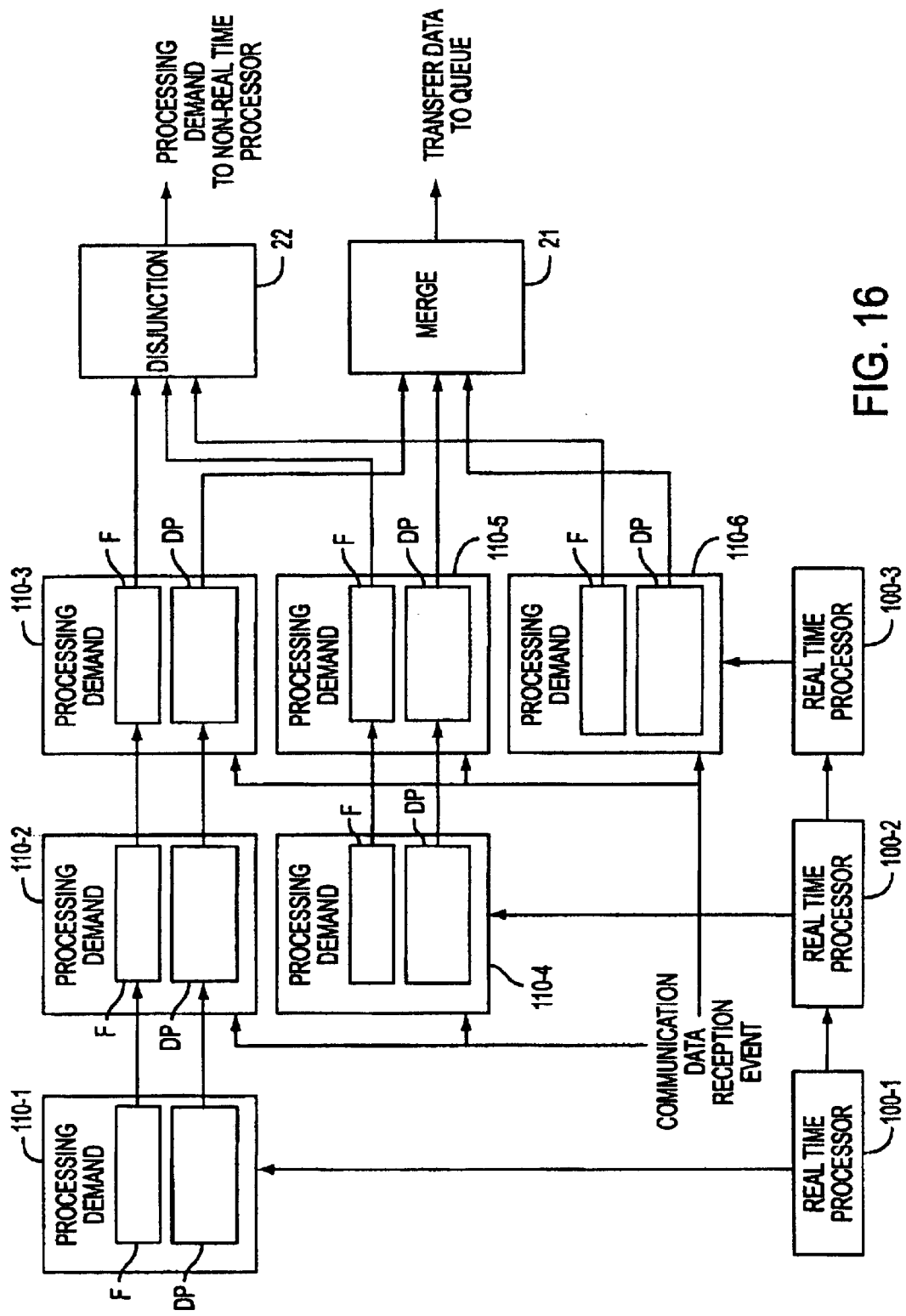
FIG. 16 is an embodiment of a function of forwarding the processing demands of real time processing processors 100-1 to 100-3 in FIG. 14.

FIG. 16 is an embodiment of a function of forwarding the processing demands of the real time processing processors 100-1 to 100-3 in FIG. 14, and a configuration diagram representing only a generation part of the write data into the processing queue 14-1 and a generation part of the processing demands.

Each of the real time processing processors 100-1 to 100-3 forwards data required for the processing of a processing demand flag F, parameters DP, or the like in a next reception event of the communication data. In figure "F" is the processing demand flag. The "DP" is the data required for processing (parameter, etc.)

At the final step, the processing demands are generated by taking a disjunction of each processing demand flag F (In use for judgment of validity/invalidity of transfer data). Furthermore, the write data (independently of the communication data) into the queue 14-1 are obtained by merging each data. Accordingly, the transfer to the queue 14-1 can be made by managing a hardware, and as it is not necessary to make the processing demands to the non-real time processing processor 11, or generate the necessary data, the load of the real time processing processors 100-1 to 100-3 can be decreased.

According to the embodiment of FIG. 14, the processing demands to the non-real time processing processors 11 by the plurality of real time processing processors 100-1 to 100-3 are collectively compiled. Thus, it is possible to avoid the contention of the data transfers, or processing demands to the processing queue 14-1 by the plurality of real time processing processors 100-1 to 100-3, and further to remove a redundancy of data stored in the queue 14-1.

Furthermore, according to the embodiment of FIG. 14, before the processing demands to the non-real time processing processors 11 by the plurality of real time processing processors 100-1 to 100-3 are collectively compiled and output, the data required for the non-real time processing processors 11 are first transferred to the queue 14-1. Thus, even if the communication data amount to be handled is enormous, it is possible to reduce a time from the generation of the processing demands to the completion of the data transfer, and to enhance the throughput of the communication data in proportion to the reduced time, or to decrease performance of the processor.

Furthermore, according to the embodiment of FIG. 14, in order to collectively compile the processing demands to the non-real time processing processors 11 by the plurality of real time processing processors 100-1 to 100-3, this is a configuration in which the data to be forwarded are accumulated by each processor, and forwarding costs for a capacity of memory functions, a forwarding capacity can be decreased.

Furthermore, in FIG. 14, it is possible to forward the processing demands independently by the hardware with the reception of the communication data as the event, by shift operation by a shift register. In such the case, as it is not necessary that the processor itself makes operation of forwarding the processing demands, the load of the processor can be decreased.

Figure 17:
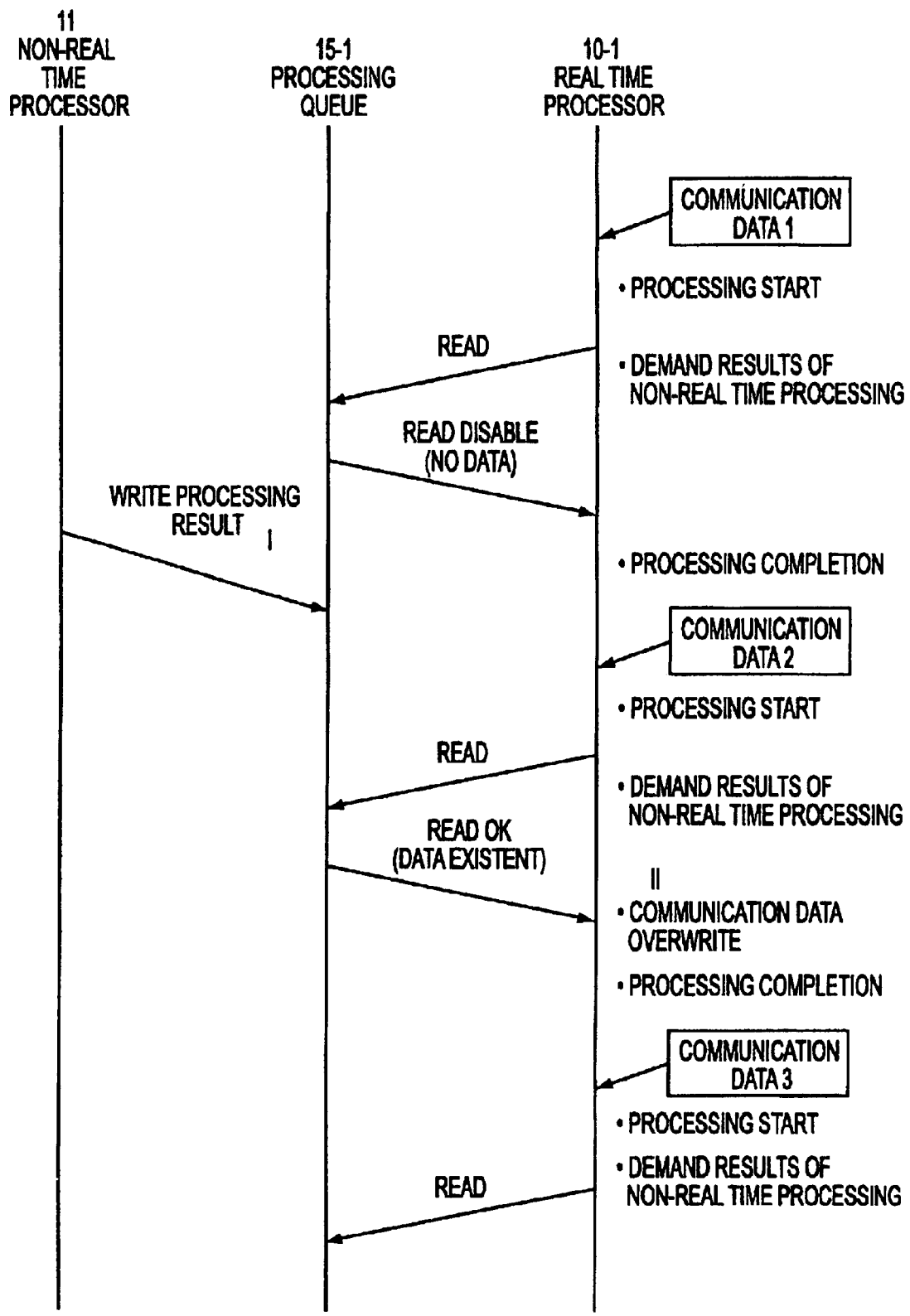
FIG. 17 is a diagram showing an operational sequence according to a fourth embodiment of the present invention to be realized in the configuration of FIG. 2.
Figure 18:
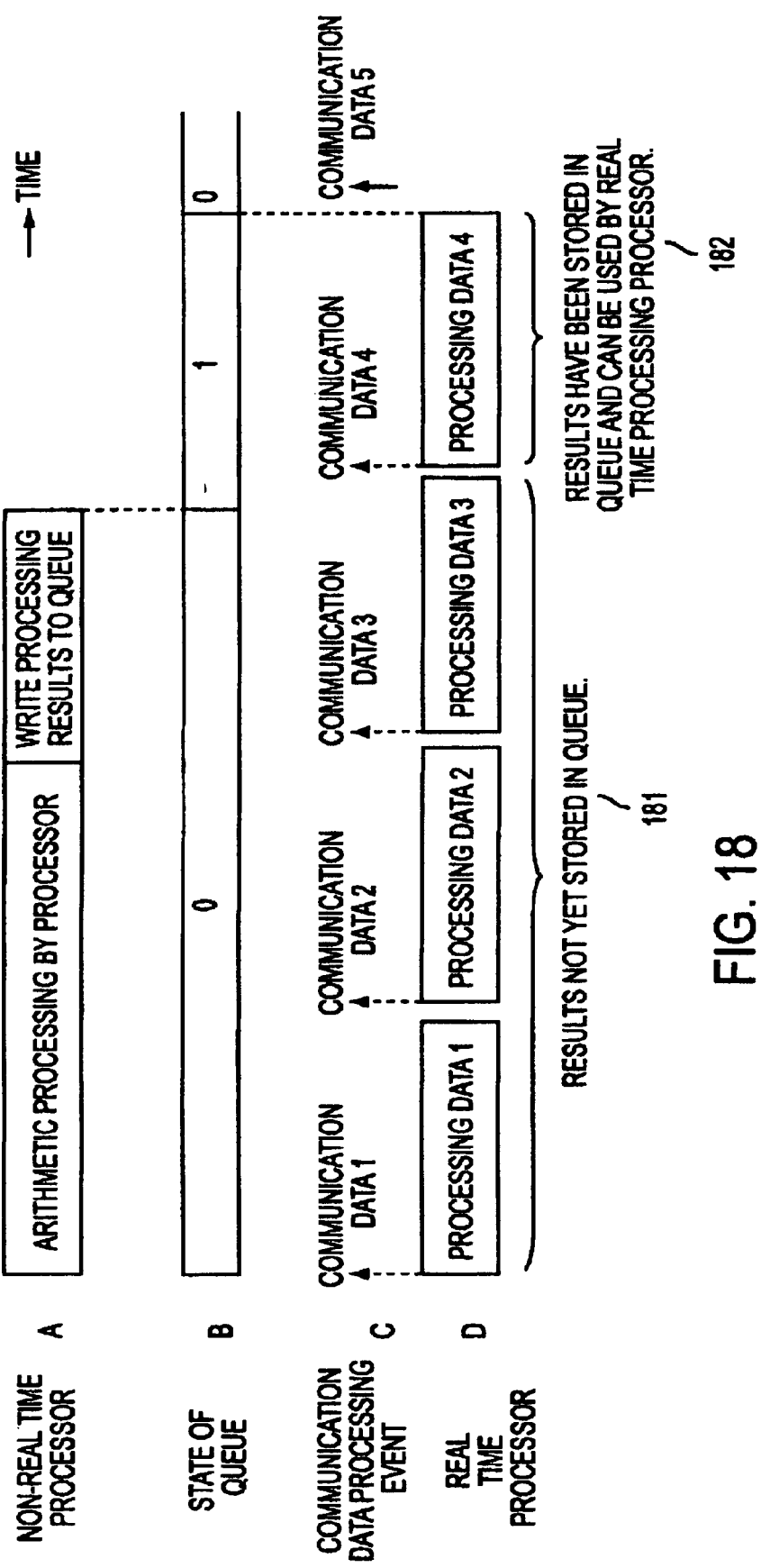
FIG. 18 is a diagram showing an operational time chart of FIG. 17.

FIG. 17 is a diagram showing an operational sequence according to a fourth embodiment of the present invention, which is realized in the configuration of FIG. 2. FIG. 18 is an operational time chart of FIG. 17. Namely, the operational sequence and operational time chart in the case where the processing results of the non-real time processing processor 11 are utilized by the real time processing processor 10.

For this reason, in FIG. 2, selection circuits 17-1, 17-2 are provided for selecting the memory functions 4-1, 4-2 of a memory, etc. for storing the communication data, and the queues 15-1, 15-2.

In FIGS. 17 and 18, in the same manner as in the above-described embodiments, the forward data communication will be explained. The queue 15-1 for storing the processing results of the non-real time processing processor 11, and the non-real time processing processor 11 write the processing results in the queue (FIG. 17, I). Accordingly, in FIG. 18, a status of the queue 15-1 changes from "0" to "1" (FIG. 18, b).

On the other hand, in FIG. 17, in order to obtain the processing results of the non-real time processing processor 11 in a process of in sequence processing the communication data 1 to 3, the real time processing processor 10-1 accesses to read the queue 15-1 by the program processing.

In the case where the communication data on a stream are overwritten to the processing results of the non-real time processing processor 11, the queue 15-1 is read out, and when the data are accumulated in the queue 15-1, a selection destination of the selection circuit 17-1 is switched to a side of the queue 15-1. Thus, it is possible to reflect the processing results of the non-real time processing processor 11 on the stream of the communication data (FIG. 17, II; FIG. 18, d). In FIG. 18 the processing data 1 through processing data 4 refers to processing of communication data 1 through processing of communication data 4 respectively. Results not yet stored in queue 181 refers to the processing results of the non-real time processing processor have not yet been stored in the queue. Item 182 refers to the processing results of the non-real time processing processor having been stored in the queue and can be used by the real time processing processor.

Here, as a method for managing the queue 15-1, in the same manner as in the operational sequence of FIG. 11, it is possible to realize the managing method by a write pointer and a read pointer.

As an example in which the processing results of the non-real time processing processor 11 are reflected on the stream of the communication data, there is an OAM cell insertion processing in an ATM cell communication system. In the case where an empty cell exists on a stream of the ATM cell, in this process, the OAM cell is inserted into a corresponding cell slot.

The OAM cell generated in the non-real time processing processor 11 has been written in the queue 15-1, and when the real time processing processor 10-1 detects the empty cell, it reads the queue 15-1, and when there are data, the selection destination of the selection circuit 17-1 is switched to a side of the queue 15-1. Thus, the communication data in the corresponding cell slot are overwritten to information read from the queue 15-1.

Figure 19:
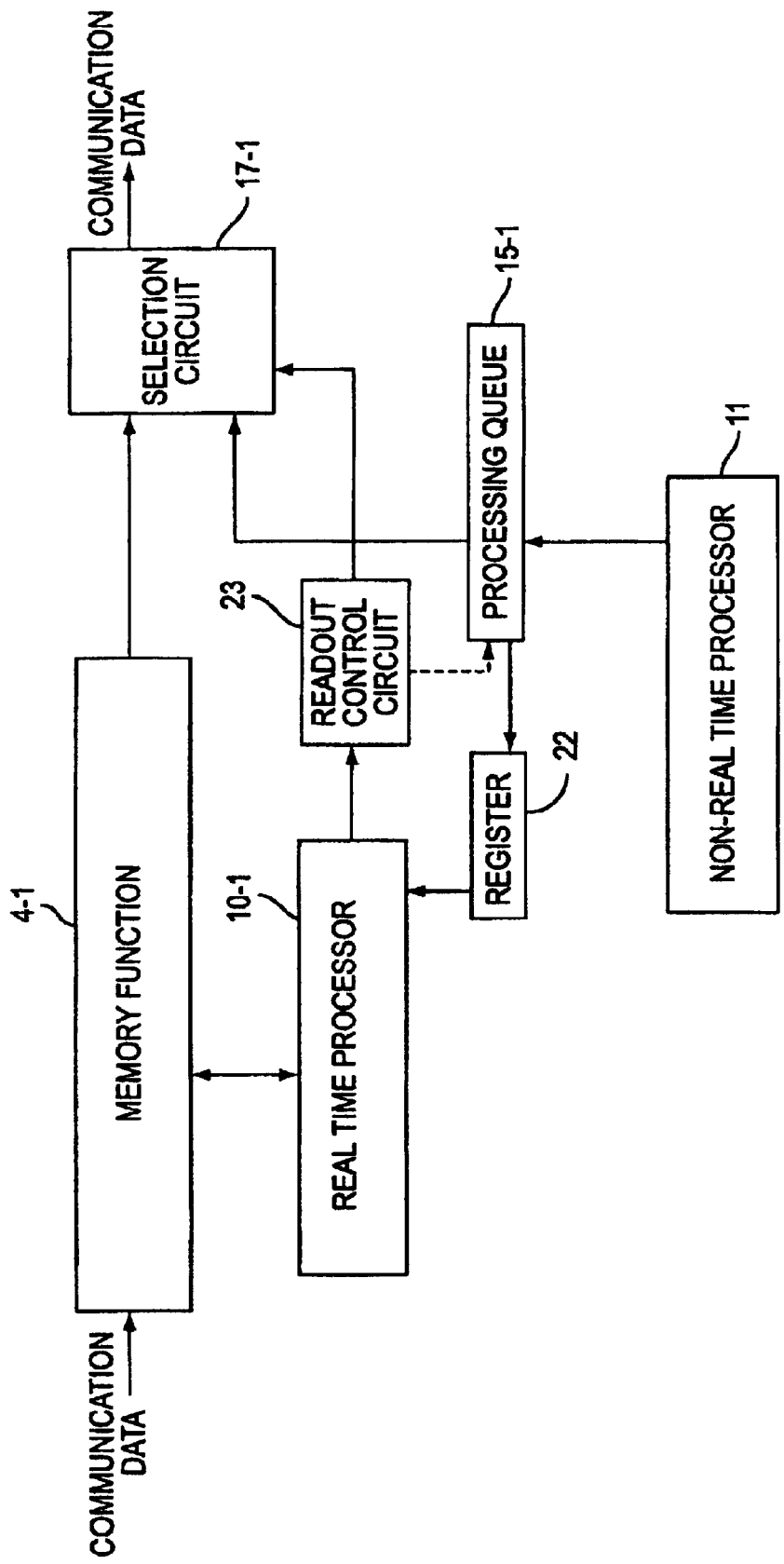
FIG. 19 is an example of a preferable configuration which realizes the operational time chart according to the embodiment of FIG. 17.

FIG. 19 is a preferable configuration of an example which realizes the operational sequence according to the embodiment of FIG. 17. In the queue 15-1 for storing the processing results of the non-real time processing processor 11, a register 22 indicating whether or not data are accumulated, and a control circuit (a readout control circuit) 23 for reading out the queue 15-1 are provided.

The non-real time processing processor 11 reads the register 22 to recognize that the data are accumulated in the queue 15-1. In this configuration, the readout control circuit 23 is activated when the data are accumulated, whereby the readout control circuit 23 independently reads out the data of the queue 15-1 by the hardware not via the processor 10-1.

According to the embodiments of FIGS. 17 to 19, in the case where the data are accumulated in the queue 15-1 for storing the processing results of the non-real time processing processor 11, the selection destination of the circuit 17-1 for selecting the output communication data is witched to a side of the queue 15-1. Accordingly, the processing results of the non-real time processing processor 11 can be reflected on the communication data flowing at a high speed.

Furthermore, according to the embodiments of FIGS. 17 to 19, the real time processing processor 10-1 recognizes by register values whether or not the data are accumulated in the queue 15-1 for storing the processing results of the non-real time processing processor 11, and the readout of the queue 15-1 is executed not by the processor, but by the control circuit 23 which reads out the queue 15-1. Therefore, the load of the processor 10-1 can be decreased. In this manner, the present invention is applicable to the ATM cell process which was realized by the Hard Wired in the prior art, thereby mitigating a necessary condition to the processor in the case where it is processed by the processor to realize the processing of the processor.

As explained above according to the embodiments with reference to the drawings, according to the present invention, it is possible to realize that each process of the communication protocol such as ATM, SDH, or the like has been performed conventionally in the hardware (Hard Wired), and is performed by the processor, and each time a standard recommendation specification of ITU-T, etc. or a small-scaled specification is changed and added, it is unnecessary to again make a hardware design (remake), and this can be coped with by a change of a program. Also, it is possible to mitigate a necessary condition to the processor to be mounted (performance, a band width, or the like), and to decrease also unit costs of the apparatus.

What is claimed is:

1. A communication protocol processing unit formed by a multiprocessor comprising:
   a queue memory for storing communication data and parameters used for an arithmetic process on the communication data;
   a first processor for receiving communication data on a data stream and performing an arithmetic process in real time on the received communication data by using parameters, and writing in the queue memory the received communication data paired with parameters updated by the arithmetic process; and
   second processor for periodically polling the queue memory and performing an arithmetic process in non-real time on the communication data written in the queue memory by using the paired, updated parameters.

2. The communication protocol processing unit according to claim 1, wherein
   the parameters include state transitional information, statistical information, or various setting information which is needed for the arithmetic process excluding the communication data, itself.

3. The communication protocol processing unit according to claim 1, wherein
   data to be processed are directly transferred to the queue memory not via the first processor with reception of the communication data as an event.

4. The communication protocol processing unit according to claim 1, wherein
   the first processor generates a processing demand signal for demanding the second processor perform the non-real time arithmetic process,
   before the first processor generates the processing demand signal, the communication data and the updated parameters are first unconditionally transferred to the queue memory, and
   the queue memory indicates validity or invalidity of the written communication data according to presence or absence of the processing demand signal generated by the first processor.

5. The communication protocol processing unit according to claim 1, further comprising:
   a selection circuit for replacing the communication data on a steam with the processing results of the second processor, wherein
   the first processor accesses to read the queue memory, and switches a selection route of the selection circuit to a side of the queue memory if the data are accumulated.

6. The communication protocol processing unit according to claim 5, further comprising:
   a register indicating whether or nor data are accumulated in the queue memory for storing the processing results of the second processor; and
   a readout control circuit for reading our the data accumulated in the queue memory,
   wherein the first processor does not access the queue memory, and reads out a set status of the register, thereby recognizing a data accumulation of the queue memory, and
   wherein the readout control circuit is accessed when the data are accumulated, and reads out the data of the queue memory not via the first processor.

7. A communication protocol processing unit formed by a multiprocessor comprising:
   a queue memory for storing communication data and parameter for an arithmetic process on the communication data;
   a plurality of first processors arranged in series to provide a pipeline-process, each first processor for receiving communication data on a data stream and performing an arithmetic process in real time on the received communication data by using parameters, and writing in the queue memory the received communication data paired with parameters updated by the arithmetic process; and
   second processor for periodically polling the queue memory and performing an arithmetic process in non-real time on the communication data written in the queue memory by using the paired, updated parameters.

8. The communication protocol processing unit according to claim 7, wherein each of the plurality of first processors generates a processing demand for the second processor, and forwards the processing demand and updated parameters to a latter stage of the first processor, and the latter stage of the first processor collectively transfers the processing demands to the queue memory.

9. The communication protocol processing unit according to claim 7, wherein each of the plurality of first processors generates a processing demand signal for demanding the second processor perform the non-real time arithmetic process, before the first processor generates the processing demand signal, the communication data and updated parameters are first unconditionally transferred to the queue memory, and the queue memory indicates validity or invalidity of the written communication data according to presence or absence of the processing demand signal generated by the first processor.

10. The communication protocol processing unit according to claim 8, wherein the processing demands and the updated parameters are structured so as to be accumulated in each of the plurality of first processors.

11. The communication protocol processing unit according to claim 9, wherein the processing demands and the updated parameters are structured so as to be accumulated in each of the plurality of first processors.

12. The communication protocol processing unit according to claim 8, wherein timing for forwarding the processing demands and the updated parameters by each of the plurality of first processors is taken with the next reception of the communication data as the event.

13. The communication protocol processing unit according to claim 8, wherein data to be processed are directly transferred to the queue memory not via the first processor with reception of the communication data as an event.

14. The communication protocol processing unit according to claim 9, wherein data to be processed are directly transferred to the queue memory not via the first processor with reception of the communication data as an event.

* * * * *